(12) United States Patent
Takizawa et al.

(10) Patent No.: US 11,429,326 B2
(45) Date of Patent: Aug. 30, 2022

(54) IMAGE FORMING SYSTEM AND IMAGE FORMING APPARATUS

(71) Applicant: CANON KABUSHIKI KAISHA, Tokyo (JP)

(72) Inventors: Masahiro Takizawa, Tokyo (JP); Ryohei Yamada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/354,770

(22) Filed: Jun. 22, 2021

(65) Prior Publication Data

US 2021/0405941 A1 Dec. 30, 2021

(30) Foreign Application Priority Data

Jun. 30, 2020 (JP) .............................. JP2020-113358

(51) Int. Cl.
| | | |
|---|---|---|
| *G06F 15/00* | (2006.01) | |
| *G06F 3/12* | (2006.01) | |
| *G06K 1/00* | (2006.01) | |
| *G06K 15/00* | (2006.01) | |
| *G06K 15/16* | (2006.01) | |

(52) U.S. Cl.
CPC .......... *G06F 3/1236* (2013.01); *G06F 3/1203* (2013.01); *G06K 15/002* (2013.01); *G06K 15/4025* (2013.01); *G06K 15/16* (2013.01)

(58) Field of Classification Search
CPC ... G06F 3/1236; G06F 3/1203; G06K 15/002; G06K 15/4025; G06K 15/16
USPC ................................ 358/1.15, 1.14, 1.13, 1.1
See application file for complete search history.

(56) References Cited

U.S. PATENT DOCUMENTS

| | | | |
|---|---|---|---|
| 9,728,083 B2* | 8/2017 | Park | H04L 67/16 |
| 2003/0093675 A1* | 5/2003 | Hibino | H04N 1/00233 |
| | | | 713/168 |

FOREIGN PATENT DOCUMENTS

| | | |
|---|---|---|
| JP | 2007076006 A | 3/2007 |
| JP | 2015214124 A | 12/2015 |
| JP | 2017019148 A | 1/2017 |

* cited by examiner

*Primary Examiner* — Douglas Q Tran
(74) *Attorney, Agent, or Firm* — Canon U.S.A., Inc. I.P. Division

(57) ABSTRACT

An image forming system includes an image forming apparatus configured to form an image on a sheet, a plurality of accessory apparatuses arranged side by side along a conveyance direction of the sheet, and a base station configured to wirelessly communicate with the image forming apparatus and the plurality of accessory apparatuses. The image forming apparatus includes one or more controllers configured to function as (i) a unit configured to acquire, from the base station, information that the base station acquires by wirelessly communicating with the plurality of accessory apparatuses, and (ii) a unit configured to output screen information for registering information about an arrangement order of the plurality of accessory apparatuses, based on the information acquired from the base station.

24 Claims, 19 Drawing Sheets

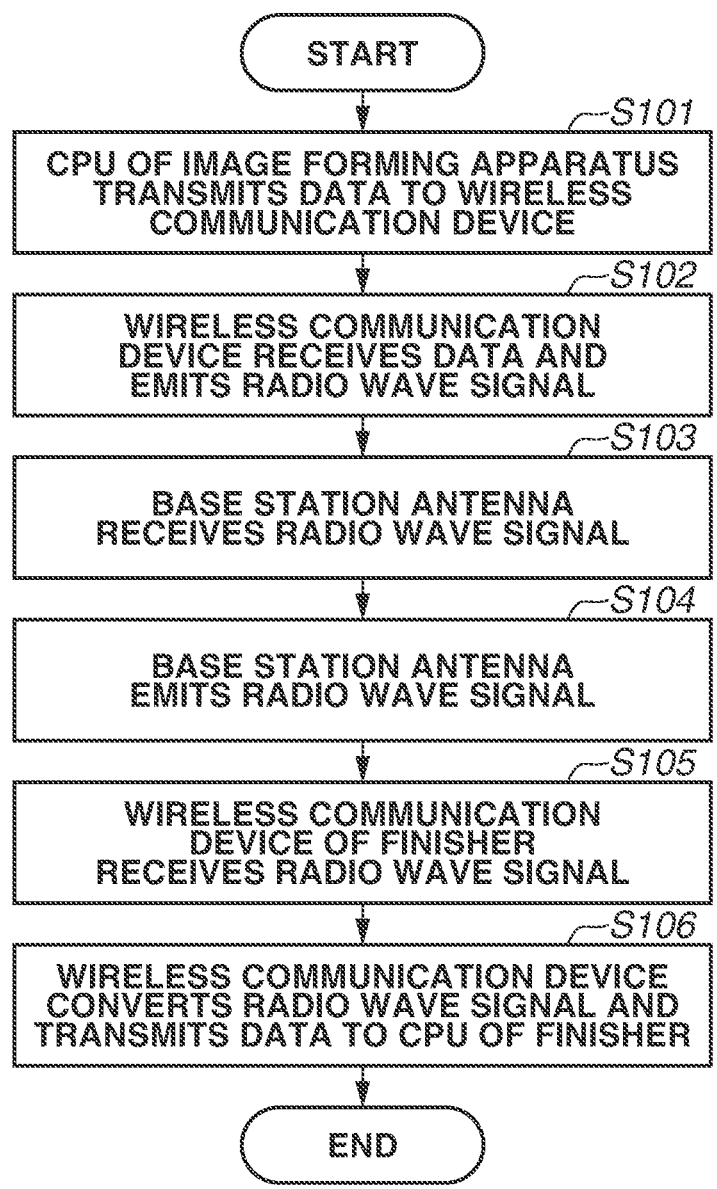

START OF INITIAL SETTING OF OPTIONAL APPARATUSES

SCREEN FOR SELECTING FIRST OPTIONAL APPARATUS

FIG. 15A

LIST OF ID INFORMATION IN WIRELESS COMMUNICATION

| OPTION NAME | ID INFORMATION IN WIRELESS COMMUNICATION |
|---|---|
| INSERTER | 1234567890 |
| FINISHER | 2345678901 |
| INSERTER FINISHER | 3456789012 |
| STACKER | 4567890123 |
| DECK A | 5678901234 |
| DECK B | 6789012345 |
| SHEET FEEDING UNIT A | 7890123456 |
| SHEET FEEDING UNIT B | 8901234567 |

FIG. 15B

LIST OF ID INFORMATION IN WIRELESS COMMUNICATION WITH ACC INFORMATION

| OPTION NAME | ID INFORMATION IN WIRELESS COMMUNICATION | MODEL NUMBER | SERIAL NUMBER |
|---|---|---|---|
| INSERTER | 1234567890 | 1234A001 | ABC1234567890 |
| FINISHER | 2345678901 | 2345B002 | DEF2345678901 |
| INSERTER FINISHER | 3456789012 | 3456A003 | GHI3456789012 |
| STACKER | 4567890123 | 4567C004 | JKL4567890123 |
| DECK A | 5678901234 | 5678D005 | MNO5678901234 |
| DECK B | 6789012345 | 6789D006 | PQR6789012345 |
| SHEET FEEDING UNIT A | 7890123456 | 7890E007 | STU7890123456 |
| SHEET FEEDING UNIT B | 8901234567 | 8901E008 | VWX8901234567 |

FIG. 15C

LIST OF ACCESSORIES SUPPORTED BY IMAGE FORMING APPARATUS

| OPTION NAME | MODEL NUMBER |
|---|---|
| INSERTER | 1234A001 |
| FINISHER | 2345B002 |
| INSERTER FINISHER | 3456A003 |

| OPTION NAME | MODEL NUMBER |
|---|---|
| DECK A | 5678D005 |
| DECK B | 6789D006 |
| SHEET FEEDING UNIT A | 7890E007 |
| SHEET FEEDING UNIT B | 8901E008 |

FIG. 15D

LIST OF ACCESSORIES SUPPORTED BY INSERTER FINISHER

| OPTION NAME | MODEL NUMBER |
|---|---|
| INSERTER | 1234A001 |
| FINISHER | 2345B002 |
| STACKER | 4567890123 |

FIG. 15E

LIST OF ACCESSORIES SUPPORTED BY DECK A

| OPTION NAME | MODEL NUMBER |
|---|---|
| NONE | NONE |

FIG.16

| OPTION NAME | ID INFORMATION IN WIRELESS COMMUNICATION | MODEL NUMBER | SERIAL NUMBER | CONNECTION LOCATION |
|---|---|---|---|---|
| DECK A | 5678901234 | 5678D005 | MNO5678901234 | -1 |
| INSERTER FINISHER | 3456789012 | 3456A003 | GHI3456789012 | 1 |
| FINISHER | 2345678901 | 2345B002 | DEF2345678901 | 2 |

IMAGE FORMING SYSTEM AND IMAGE FORMING APPARATUS

BACKGROUND

Field

The present disclosure relates to an image forming system in which an image forming apparatus cooperates with a plurality of processing apparatuses. The image forming apparatus may be used as a copying machine, a printer, a multifunction peripheral thereof, or the like.

Description of the Related Art

An image forming apparatus (for example, a printing apparatus) that prints an image on a sheet (paper) can be configured to be connectable to a plurality of optional processing apparatuses so as to be able to extend the functionality thereof. For example, a user who wishes to perform printing on a large number of sheets can increase the number of loadable sheets by connecting a sheet feeding apparatus to the image forming apparatus. A user who wishes to bookbind sheets with images formed thereon can bookbind the sheets by connecting a bookbinding apparatus to the image forming apparatus. In order to implement cooperation between such an optional processing apparatus and the image forming apparatus, it may be necessary to appropriately share information, such as the timing of delivering and receiving the sheets, between the apparatuses. Japanese Patent Application Laid-Open No. 2015-214124 discusses a system in which an image forming apparatus and a plurality of optional processing apparatuses are connected in a row via a cable to implement information sharing between the image forming apparatus and each of the optional apparatuses.

In the system discussed in Japanese Patent Application Laid-Open No. 2015-214124, the apparatuses are connected to each other via the cable, and this may impede the change or relocation of the optional apparatuses. One of the methods for solving such issues is to implement the cooperation among the apparatuses via wireless communication instead of wired communication. In particular, it may be desirable to employ wireless communication using the Fifth Generation Mobile Communication System (hereinafter abbreviated as 5G), which is the next-generation communication standard, because low-delay communication is required to enable the image forming apparatus and the plurality of optional apparatuses to cooperate appropriately.

If the communication configuration discussed in Japanese Patent Application Laid-Open No. 2015-214124 is simply replaced with wireless communication, an issue can arise where, even if the communication is established, information required for the cooperation cannot be obtained sufficiently. This is because the configuration using wireless communication is not capable of identifying the physical arrangement order of the apparatuses simply by establishing the communication, unlike the configuration discussed in Japanese Patent Application Laid-Open No. 2015-214124 that is capable of identifying the physical arrangement order of the apparatuses by virtue of connecting the apparatuses in a row. Therefore, it is desirable that the image forming system that implements the cooperation among the apparatuses using wireless communication is equipped with a method for acquiring information regarding the arrangement order of the apparatuses.

SUMMARY

Various embodiments of the present disclosure provide an image forming system that enables an image forming apparatus and a plurality of processing apparatuses to cooperate via wireless communication. In particular, various embodiments provide an image forming system capable of acquiring information regarding the arrangement order of the plurality of processing apparatuses.

According to one embodiment of the present disclosure, an image forming system includes an image forming apparatus configured to form an image on a sheet, a plurality of accessory apparatuses arranged side by side along a conveyance direction of the sheet, and a base station configured to wirelessly communicate with the image forming apparatus and the plurality of accessory apparatuses. The image forming apparatus includes one or more controllers configured to function as (i) a unit configured to acquire, from the base station, information that the base station acquires by wirelessly communicating with the plurality of accessory apparatuses, and (ii) a unit configured to output screen information for registering information about an arrangement order of the plurality of accessory apparatuses, based on the information acquired from the base station.

Further features of various embodiments of the present disclosure will become apparent from the following description of exemplary embodiments with reference to the attached drawings.

BRIEF DESCRIPTION OF THE DRAWINGS

FIG. 5 is a flowchart illustrating processing regarding wireless communication according to one embodiment.

FIGS. 15A to 15E are diagrams each illustrating a list of optional apparatuses managed by an image forming apparatus according to one embodiment.

FIG. 16 is a diagram illustrating an example of a list of optional apparatuses selected as cooperation targets according to one embodiment.

DESCRIPTION OF THE EMBODIMENTS

In the following description, a basic configuration according to an exemplary embodiment of the present disclosure will be described with reference to the drawings, and then a characteristic configuration according to an exemplary embodiment of the present disclosure will be described in detail with reference to the drawings using a plurality of specific examples. However, configurations for implementing embodiments of the present disclosure shall not be limited to the configurations described below. For example, features of the configurations described below may be partially omitted or replaced with an equivalent thereof within a range in which similar advantageous effects can be achieved.

A configuration of an image forming system according to a first exemplary embodiment of the present disclosure will be described next. The image forming system according to the present exemplary embodiment includes a base station, an image forming apparatus, and optional apparatuses (processing apparatuses), which wirelessly communicate with one another. The image forming system is configured to collect information about each of the processing apparatuses in the image forming apparatus via the base station and then display a screen for determining the arrangement order of the processing apparatuses based on the collected information.

<Image Forming System>

Figure 1:
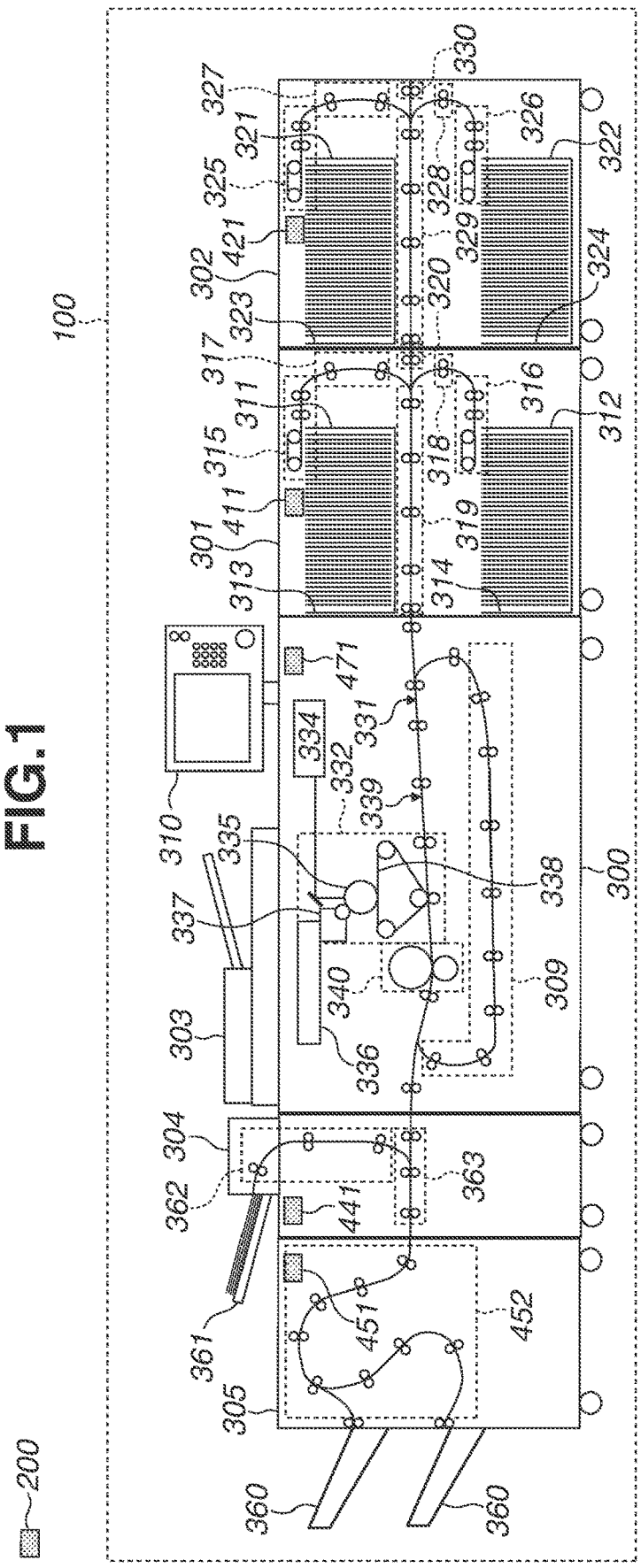
FIG. 1 is a cross-sectional view illustrating a configuration of an image forming system according to one embodiment.
Figure 2:
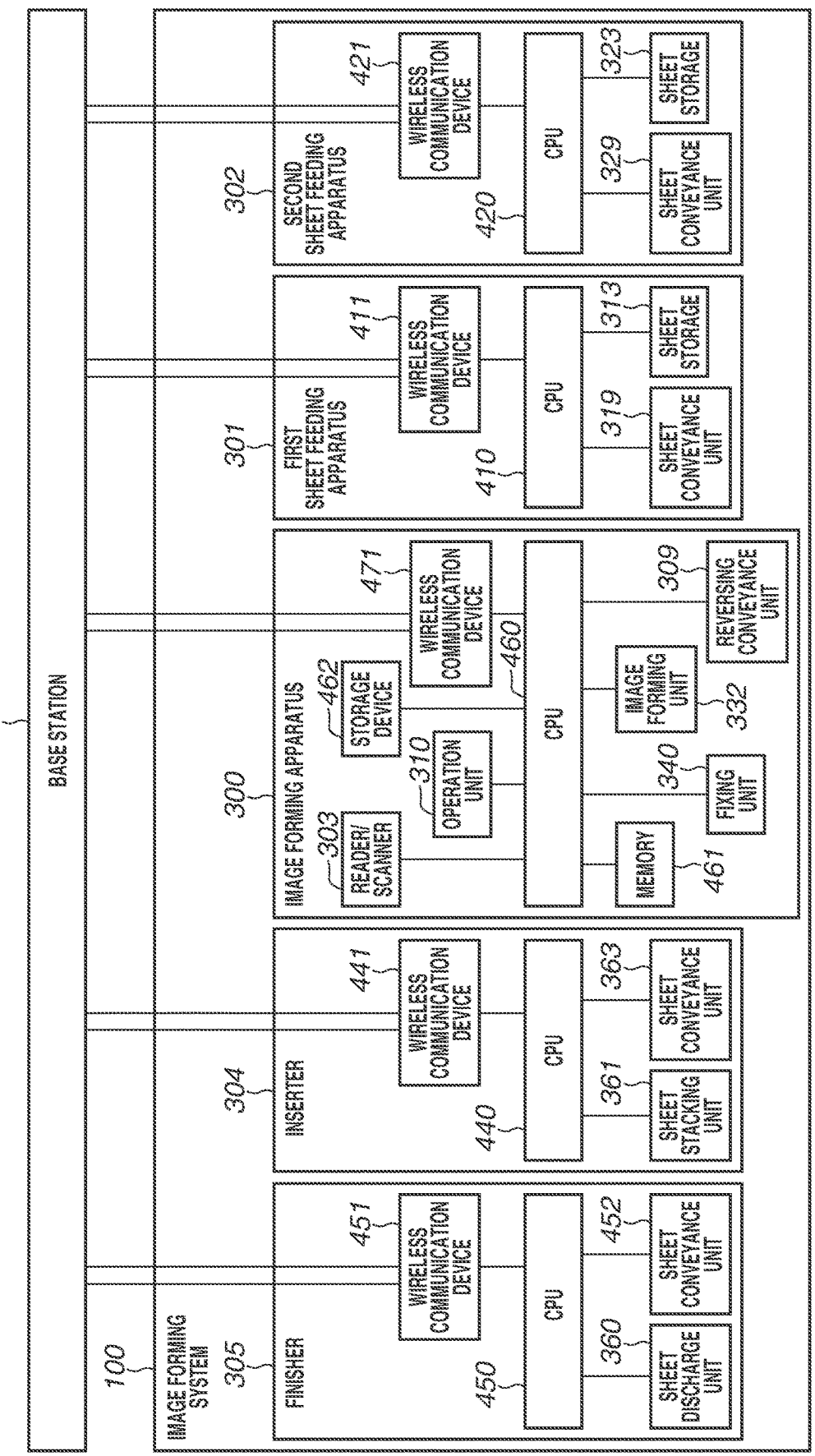
FIG. 2 is a functional block diagram illustrating the configuration of the image forming system according to one embodiment.

FIG. 1 is a cross-sectional view illustrating the configuration of the image forming system. FIG. 2 is a functional block diagram illustrating the configuration of the image forming system.

As illustrated in FIGS. 1 and 2, an image forming system 100 includes an image forming apparatus 300 as a main apparatus that forms an image, and also includes a first sheet feeding apparatus 301, a second sheet feeding apparatus 302, an inserter 304, and a finisher 305 as optional apparatuses. The image forming system 100 may be configured to cooperate with another optional apparatus.

The image forming apparatus 300 includes an operation unit 310 and a reader/scanner 303. The image forming apparatus 300 forms images on sheets based on a sheet processing setting made by a user via the operation unit 310 or an external host personal computer (PC) and based on image information transmitted from the reader/scanner 303 or the external host PC. The sheet processing setting includes the respective processing contents of the first sheet feeding apparatus 301, the second sheet feeding apparatus 302, the inserter 304, and the finisher 305 that are optional apparatuses. The image forming apparatus 300 performs a cooperation operation by communicating the processing contents to the respective optional apparatuses.

Next, a series of processing performed by the image forming system 100 will be described. The series of processing includes feeding and conveying sheets, forming images on the sheets, performing post-processing on the sheets, outputting the sheets as a print product, and providing the print product to the user.

The first sheet feeding apparatus 301 includes two stages of upper and lower sheet feeding units 311 and 312, and stores a bundle of sheets in each of sheet storages 313 and 314 that are provided in the upper and lower sheet feeding units 311 and 312, respectively. The first sheet feeding apparatus 301 feeds the sheets from the sheet storages 313 and 314 as necessary.

In the sheet feeding operation, the sheets are fed and conveyed while being separated one by one by each of sheet feed/conveyance units 315 and 316 that are provided in the upper and lower sheet feeding units 311 and 312, respectively. After being conveyed, the sheets are continuously conveyed by an upper sheet conveyance unit 317 in the case of the upper sheet feeding unit 311 and by a lower sheet conveyance unit 318 in the case of the lower sheet feeding unit 312. The first sheet feeding apparatus 301 is configured in such a manner that the sheets from each of the upper and lower sheet conveyance units 317 and 318 can be continuously conveyed by a merged sheet conveyance unit 319 at which the sheets from the lower sheet conveyance unit 318 are merged with the sheets from the upper sheet conveyance unit 317.

Although not illustrated, each of the sheet conveyance units includes a conveyance stepping motor, and controls the driving of the motor to mechanically transmit the driving force from the motor to a conveyance roller therein, thereby rotating the roller to convey the sheets.

The first sheet feeding apparatus 301 sequentially feeds and conveys the sheets in each of the sheet storages 313 and 314 while separating the sheets one by one, in response to a sheet request in the job specified by the user and received via wireless communication. The first sheet feeding apparatus 301 conveys the sheets sequentially to the image forming apparatus 300. At this time, the first sheet feeding apparatus 301 transmits information about sheet conveyance timing to the image forming apparatus 300 via wireless communication. The image forming apparatus 300 performs processing for receiving the sheets from the first sheet feeding apparatus 301 based on the information about sheet conveyance timing, so that the conveyance of the sheets is continued. It is desirable that the information about sheet conveyance timing is transmitted with a communication delay of several milliseconds (ms) or shorter. For example, in a case where the sheet is conveyed at a speed of 1000 mm/s and there is a delay of 100 ms in wireless communication, the sheet is conveyed by 100 mm during the delay and this may cause a delay and failure in the sheet reception processing of the image forming apparatus 300 and result in a jam. In the present exemplary embodiment, wireless communication using the Fifth Generation Mobile Communication System (5G) is employed as wireless communication with a delay of approximately 1 ms, thereby successfully performing the operation for delivering and receiving the sheets between the apparatuses described above.

The second sheet feeding apparatus 302 includes two stages of upper and lower sheet feeding units 321 and 322, and stores a bundle of sheets in each of sheet storages 323 and 324 that are provided in the upper and lower sheet feeding units 321 and 322, respectively. The second sheet feeding apparatus 302 feeds the sheets from the sheet storages 323 and 324 as necessary. The second sheet feeding apparatus 302 sequentially feeds and conveys the sheets in each of the sheet storages 323 and 324 while separating the sheets one by one, similarly to the first sheet feeding apparatus 301. The second sheet feeding apparatus 302 conveys the sheets sequentially to the first sheet feeding apparatus 301. At this time, the second sheet feeding apparatus 302 transmits information about sheet conveyance timing to the first sheet feeding apparatus 301 via wireless communication. The first sheet feeding apparatus 301 performs processing for receiving the sheets from the second sheet feeding apparatus 302 based on the information about sheet conveyance timing, so that the sheets conveyed by a sheet conveyance unit 329 are continuously conveyed.

The image forming apparatus 300 receives the sheets one by one from the first sheet feeding apparatus 301, and a central processing unit (CPU) 460 changes the image forming condition based on setting information. The setting information includes, for example, the sheet type specified via the operation unit 310, the grammage data detected by the first sheet feeding apparatus 301, and image quality. Then, an image forming unit 332, which will be described below, performs an image forming operation. After receiving the sheets from the first sheet feeding apparatus 301 connected to the image forming apparatus 300, the image forming apparatus 300 conveys the sheets while controlling each sheet conveyance unit, and causes the image forming unit 332 to perform the image forming operation based on received image data, starting from sheet detection by a registration sensor 331.

A latent image is formed on a photosensitive drum 335 using laser light corresponding to the image data, by lighting up a semiconductor laser and controlling the light amount of the laser in a laser scanner unit 334 and at the same time by controlling a scanner motor that controls the rotation of a polygonal mirror (not illustrated). The latent image on the photosensitive drum 335 is developed into a toner image by a development unit 337 to which toner is supplied from a toner bottle 336, and the toner image is primarily transferred from the photosensitive drum 335 onto an intermediate transfer belt 338.

The toner image, which has been transferred to the intermediate transfer belt 338, is secondarily transferred onto the sheet, so that the toner image is formed on the sheet.

At this time, an image reference sensor 339 detects the position of the leading edge of the sheet to align the leading edge. After the secondary transfer, the sheet is conveyed to a fixing unit 340 that applies heat and a pressure to the sheet, and melts and fixes the toner to the sheet.

The sheet subjected to the fixing processing is conveyed to a reversing conveyance unit 309 in a case where an image is to be printed on the back side of the sheet or the sheet is to be turned upside down. The sheet subjected to the fixing processing is continuously conveyed to the inserter 304 located downstream in a case where the printing is completed. At this time, the image forming apparatus 300 transmits information about sheet conveyance timing to the inserter 304 via wireless communication. The inserter 304 performs processing for receiving the sheets from the image forming apparatus 300 based on the information about sheet conveyance timing, so that the conveyance of the sheets is continued.

The inserter 304 feeds sheets stacked on a sheet stacking unit 361 at predetermined timing based on sheet insertion information received via wireless communication, and conveys the sheets via sheet conveyance units 362 and 363 to insert the sheets into the sheets received from the image forming apparatus 300. Then, the inserter 304 continuously conveys the sheets to the finisher 305 located downstream. At this time, the inserter 304 transmits information about sheet conveyance timing to the finisher 305 via wireless communication. The finisher 305 performs processing for receiving the sheets from the inserter 304 based on the information about sheet conveyance timing, so that the conveyance of the sheets is continued.

The finisher 305 performs desired post-processing on the sheets based on a processing instruction (such as stapling, punching, folding, or sorting) received via wireless communication, conveys the sheets via a sheet conveyance unit 452, and sequentially outputs the sheets onto any of sheet discharge trays (sheet discharge units) 360, so that the sheets are provided to the user as a print product.

<Control Configuration>

Next, a wireless communication configuration for implementing the above-described cooperation will be described. In the image forming system 100, the image forming apparatus 300, the first sheet feeding apparatus 301, the second sheet feeding apparatus 302, the inserter 304, and the finisher 305 are controlled by the respective CPUs (460, 410, 420, 440, and 450) and also include wireless communication devices 471, 411, 421, 441, and 451 for carrying out wireless communication, respectively.

The image forming apparatus 300 includes the CPU 460, a memory 461, a storage device 462, the operation unit 310, the reader/scanner 303, and the wireless communication device 471 in addition to the fixing unit 340, the image forming unit 332, and the reversing conveyance unit 309 that are described above. These functional units operate in cooperation with one another to implement functions such as printing, scanning, and copying.

The reader/scanner 303 is a unit (a reading unit or a reading device) that uses a charge-coupled device (CCD) sensor or a contact image sensor (CIS) to read an image or a character on a document and convert the read image or character to image data. The document to be read may be placed on a platen glass or may be conveyed by an auto document feeder (ADF).

The operation unit 310 is a user interface (UI) unit used by the user to operate the image forming apparatus 300 and is capable of displaying and inputting information. The operation unit 310 includes a display that functions as a display unit capable of displaying information, and a touch panel that functions as an input unit (a reception unit) for receiving an input of information.

The CPU 460 controls the entire image forming apparatus 300, and implements various functions of the image forming apparatus 300 by connecting to the functional units to control the units.

The memory 461 is a system work memory used when the CPU 460 operates, and is a random access memory (RAM), for example. The memory 461 stores arithmetic data of the CPU 460 and various kinds of programs therein. The memory 461 is also used as an image memory for temporarily storing image data subjected to image processing.

The storage device 462 is, for example, a boot read only memory (ROM), and stores a boot program for the image forming apparatus 300 therein. Furthermore, the storage device 462 is, for example, a memory device (a memory unit or a storage unit) such as a hard disk drive (HDD) or a solid state drive (SSD). The storage device 462 functions as a nonvolatile secondary storage device for storing large-size program and data. The program and data stored in the storage device 462 are used after being loaded into the memory 461.

Each of the above-described wireless communication devices 471, 411, 421, 441, and 451 transmits and receives information to and from any of the other wireless communication devices or an external host PC (not illustrated) via a base station 200 using wireless communication. Hereinafter, wireless communication between the wireless communication devices or with the external host PC via the base station 200 will be referred to as "wireless communication".

<Wireless Communication Device>

Figure 4A:
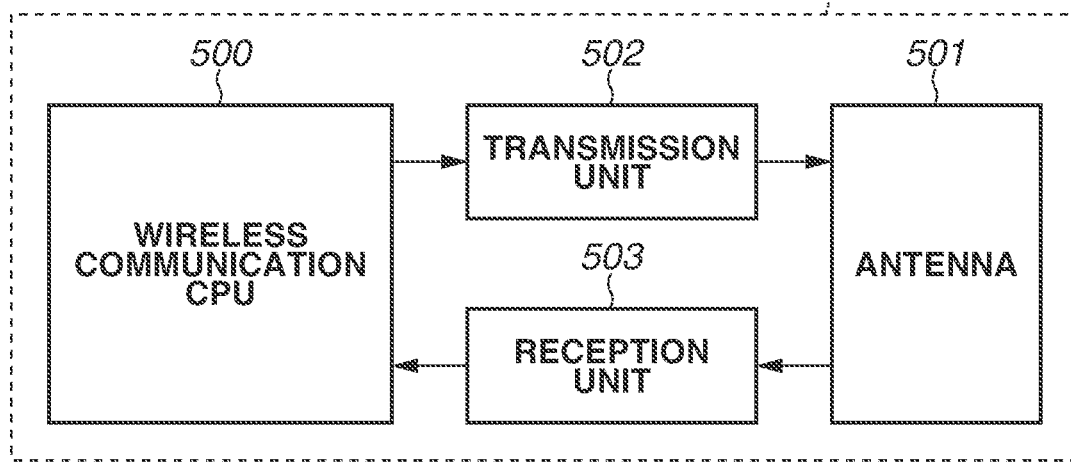
FIG. 4A is a functional block diagram illustrating a wireless communication device according to one embodiment.

FIG. 4A is a functional block diagram illustrating the wireless communication device 471. The wireless communication devices 411, 421, 441, and 451 included in the respective optional apparatuses are similar in configuration to the wireless communication device 471, and thus the descriptions thereof will be omitted. The wireless communication device 471 includes a wireless communication CPU 500, an antenna 501, a transmission unit 502, and a reception unit 503. At the time of reception in wireless communication, the antenna 501 receives a radio wave signal, and the reception unit 503 generates a data string by, for example, filtering the received signal at a predetermined frequency, amplifying the signal, and then demodulating the signal, and inputs the generated data string to the wireless communication CPU 500. The wireless communication CPU 500 transmits the received data string to the CPU 460 of the image forming apparatus 300. In addition, at the time of transmission in wireless communication, the wireless communication CPU 500 inputs, to the transmission unit 502, the data string that is received from the CPU 460 and is to be transmitted via wireless communication. The transmission unit 502 modulates the input data string into a modulated signal, oscillates the signal at a predetermined frequency, amplifies the signal, and then inputs the signal to the antenna 501, and the antenna 501 emits the radio wave signal. Here, the predetermined frequency refers to a frequency defined by Third Generation Partnership Project (3GPP) as the frequency band for 5G. This frequency has a value of approximately 450 MHz to 6000 MHz or 30 GHz to 100 GHz, and is a radio wave generally called a millimeter wave.

The radio wave signals emitted from the wireless communication devices 411, 421, 441, 451, and 471 using the above-described method are received by the base station 200 illustrated in FIG. 2. The base station 200 emits a radio wave signal to any of the wireless communication devices 411, 421, 441, 451, and 471 based on the received content, and receives a radio wave signal from any of the wireless communication devices 411, 421, 441, 451, and 471.

<Disposition of Wireless Communication Device>

Figure 6:
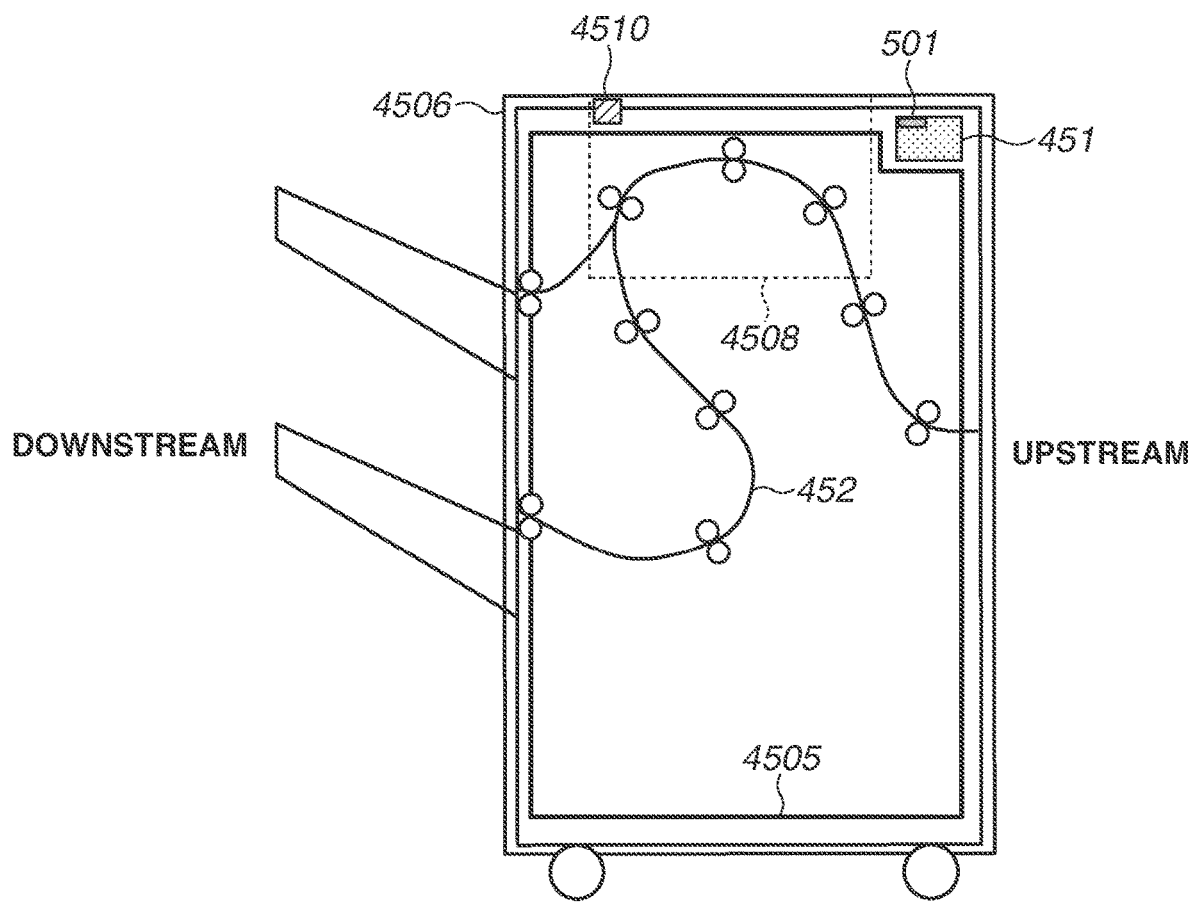
FIG. 6 is a side cross-sectional view illustrating a configuration of a finisher according to one embodiment.

The disposition of the wireless communication devices 411, 421, 441, 451, and 471 will be described next with reference to FIGS. 6 and 7.

The above-described millimeter wave used in wireless communication is prone to large attenuation due to a shielding object such as a metal, and thus it is desirable to reduce shielding objects interposed between each of the wireless communication devices 411, 421, 441, 451, and 471 and the base station 200 that serves as the communication partner. Furthermore, the millimeter wave has narrow directionality, and thus it is desirable to dispose the antenna 501 of each of the wireless communication devices 411, 421, 441, 451, and 471, which receives and emits a wireless radio wave, in a direction oriented toward the communication partner to a certain extent. In addition, it is common that the base station 200 is often disposed in a higher position than the image forming system 100 in the height direction thereof so as to be able to wirelessly communicate with wireless communication apparatuses other than the image forming system 100. FIG. 6 is a side cross-sectional view illustrating a configuration of the finisher 305.

The finisher 305 includes the sheet conveyance unit 452, an apparatus metal plate 4505, an apparatus exterior 4506 made from a resin mold, an opening unit 4508, an opening shaft 4510, and the wireless communication device 451.

The apparatus metal plate 4505 works as a shielding object against wireless communication. Thus, in order to perform excellent wireless communication with the base station 200, the wireless communication device 451 is disposed at a higher position than the apparatus metal plate 4505 and on the inner side of the apparatus exterior 4506 made from a resin mold, and the antenna 501 of the wireless communication device 451 is also disposed on the top side of the finisher 305. The reason for disposing the wireless communication device 451 on the inner side of the apparatus exterior 4506 is to prevent the user from touching the wireless communication device 451. The resin mold is not an obstacle to wireless communication because the shielding level to block the radio wave is extremely low compared to the metal.

Figure 7:
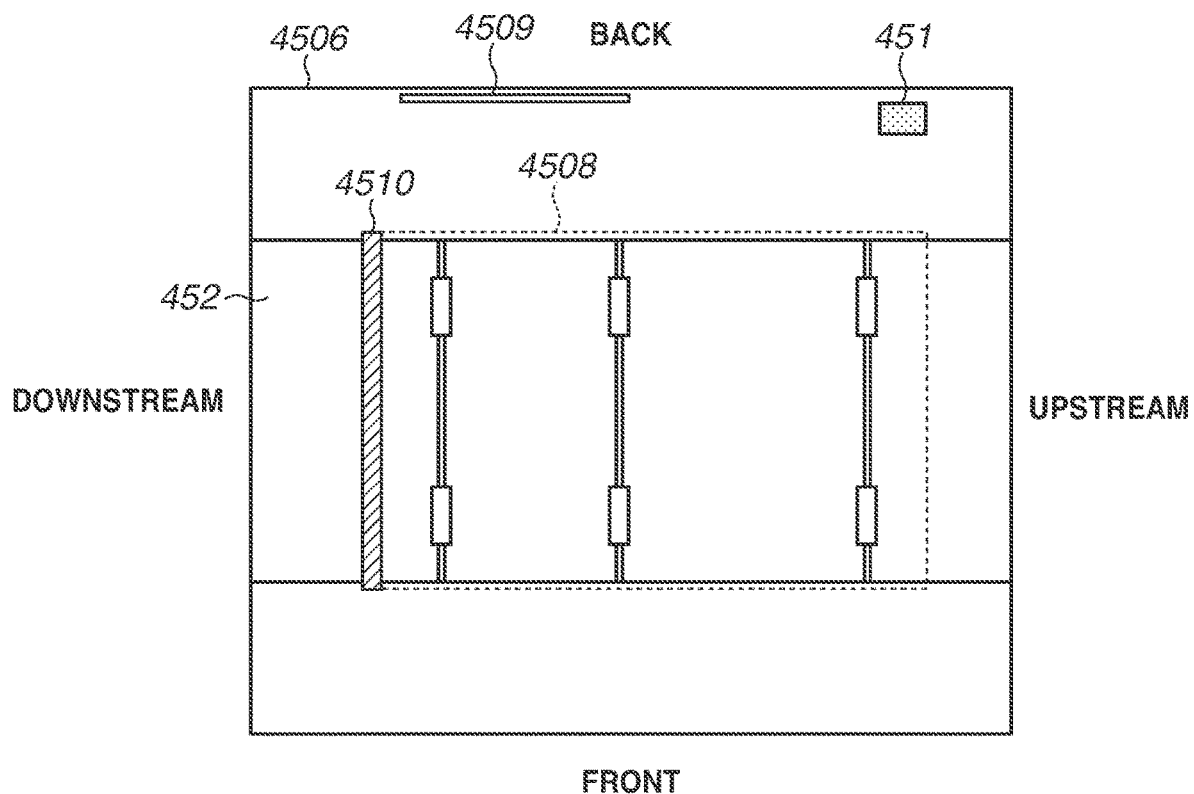
FIG. 7 is a top cross-sectional view illustrating the configuration of the finisher according to one embodiment.

FIG. 7 is a top cross-sectional view illustrating the configuration of the finisher 305. The finisher 305 includes the opening unit 4508 that has the same width as that of the sheet conveyance unit 452 so that the user can remove a jammed sheet from the sheet conveyance unit 452 in the case of a jam. The opening unit 4508 can be opened upward about the opening shaft 4510. If the wireless communication device 451 is disposed at the opening unit 4508, the direction in which the wireless communication device 451 is oriented may change while a jammed sheet is removed (while the opening unit 4508 is opened), and result in a failure in wireless communication during the removal of the jammed sheet. Thus, the wireless communication device 451 is disposed at a place other than the portion of the sheet conveyance unit 452 corresponding to the width of the opening unit 4508. More specifically, as illustrated in FIG. 7, the wireless communication device 451 is disposed on the back side of the finisher 305 with respect to the sheet conveyance unit 452. The reason for disposing the wireless communication device 451 on the back side of the finisher 305 is to facilitate wiring between the wireless communication device 451 and a control board 4509 that is located on the back side and includes the CPU 450 to be connected wiredly to the wireless communication device 451.

As describe above, the wireless communication device 451 of the finisher 305 is disposed at a higher position than the apparatus metal plate 4505, on the inner side of the apparatus exterior 4506 made from a resin mold, and at a place closer to the back side than the sheet conveyance unit 452 having the conveyance width. In addition, the antenna 501 of the wireless communication device 451 is disposed on the top side of the finisher 305. The above-described method for disposing the wireless communication devices 411, 421, 441, 451, and 471 has been described using the finisher 305 as an example, but any optional apparatus including an apparatus metal plate, an apparatus exterior made from a resin mold, and a sheet conveyance unit can achieve stable wireless communication by using a method similar to the above-described method <Base Station>

Each of the above-described wireless communication devices 411, 421, 441, 451, and 471 transmits and receives information to and from any of the other wireless communication devices or the external host PC via the base station 200 using wireless communication. The base station 200 includes a multi-antenna including a plurality of antennas arranged in a matrix manner in order to implement a technique called massive multiple input and multiple output (MIMO).

Figure 4B:
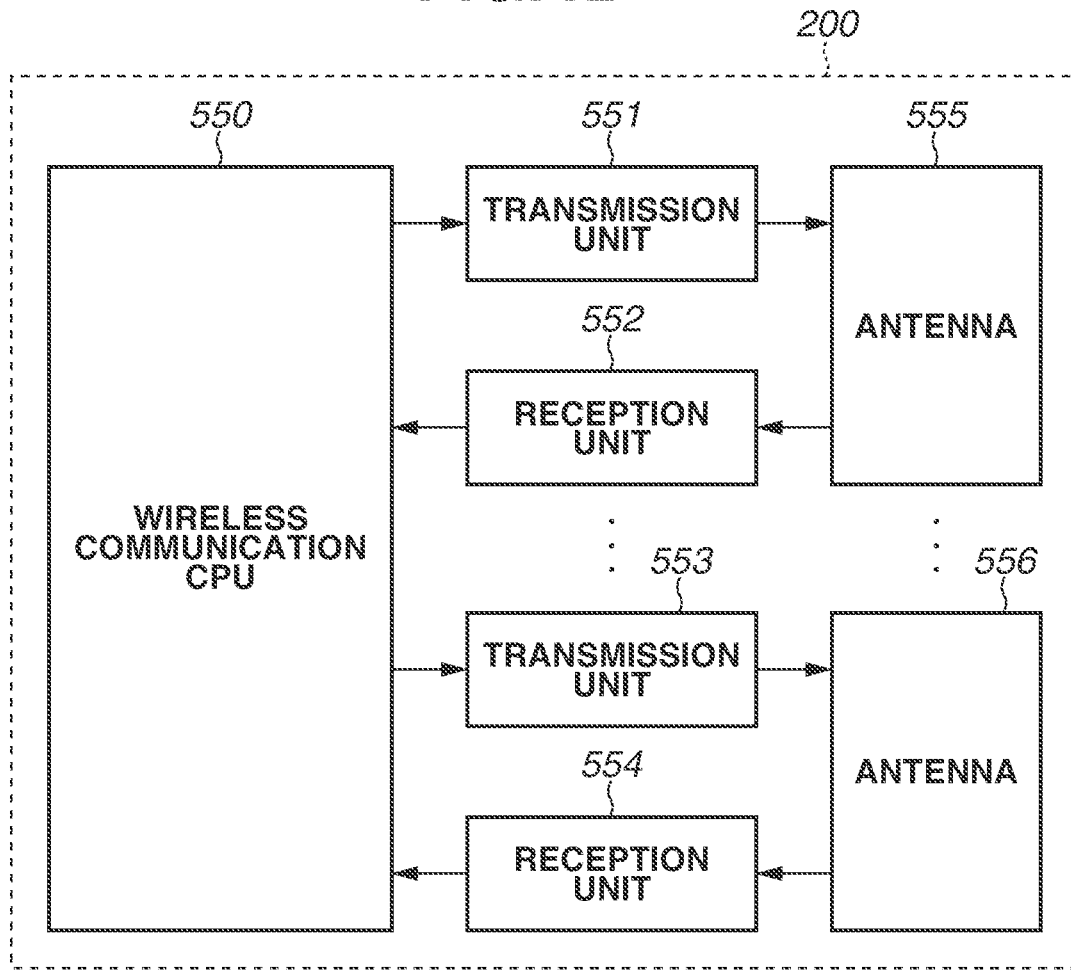
FIG. 4B is a functional block diagram illustrating a base station according to one embodiment.

As illustrated in FIG. 4B, the base station 200 includes a wireless communication CPU 550 and a large number of antennas, transmission units, and reception units. FIG. 4B is a functional block diagram illustrating the base station 200. For simplification, FIG. 4B illustrates two antennas 555 and 556, two transmission units 551 and 553, and two reception units 552 and 554, and omits the plurality of antennas, transmission units, and reception units other than these. The transmission units 551 and 553 are similar in configuration to the transmission unit 502. The reception units 552 and 554 are similar in configuration to the reception unit 503. The antennas 555 and 556 are similar in configuration to the antenna 501.

Figure 3:
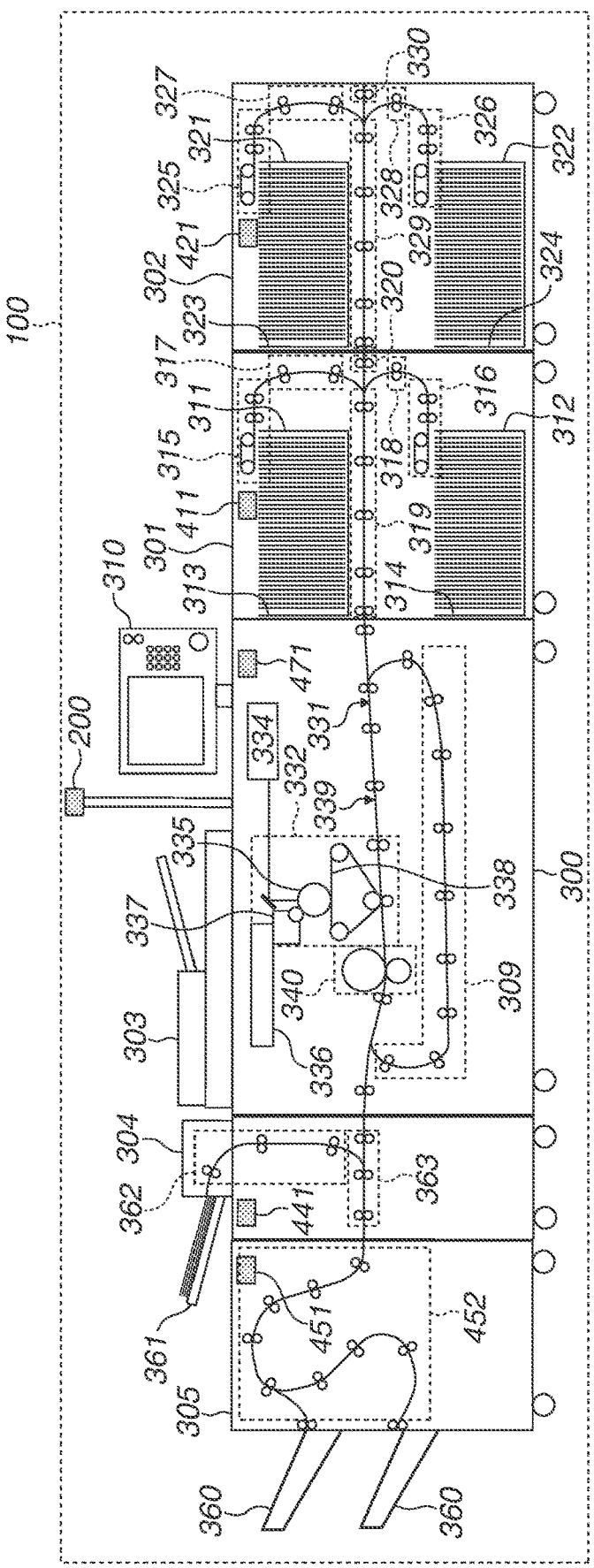
FIG. 3 is a cross-sectional view illustrating a modification example of the configuration of the image forming system according to one embodiment.

The base station 200 may be located at a place outside the image forming system 100 as illustrated in FIG. 1, or may be attached to the image forming system 100 as illustrated in FIG. 3. FIG. 3 illustrates a modification example of the configuration of the image forming system 100. In a case where the base station 200 is provided above the image forming apparatus 300 as illustrated in FIG. 3, the communication between the base station 200 and the image forming apparatus 300 may be wired.

<Initial Setting>

Initial setting is generally performed in advance to establish wireless communication between the base station 200 and each of the wireless communication devices 411, 421, 441, 451, and 471. The initial setting refers to an exchange of identification information between 5G wireless communication modules for allowing the 5G wireless communication modules to recognize each other. In 5G wireless communication, a 5G-identification (ID) serves as the identification information, and the initial setting is completed when the 5G wireless communication modules exchange the identification information with each other. For example, the 5G-ID is set in a subscriber identity module (SIM) connected to each of the image forming apparatus 300 and the optional apparatuses. It is assumed here that the 5G-ID is written by the SIM manufacturer in advance.

In the present exemplary embodiment, the following 5G-IDs are respectively assigned to the image forming apparatus 300 and the optional apparatuses, and the user is notified of each of the 5G-IDs in association with the corresponding apparatus (for example, paper with the 5G-ID written thereon is provided when each of the apparatuses is delivered to the user).

The image forming apparatus 300: 00000
The first sheet feeding apparatus 301: 00001
The second sheet feeding apparatus 302: 00002
The inserter 304: 00004
The finisher 305: 00005

To perform communication with the base station 200, each of the image forming apparatus 300 and the optional apparatuses connects to the base station 200 based on the SIM information preset in each of the apparatuses. When each of the apparatuses detects the base station 200 at power-on, the CPU of each of the apparatuses performs connection processing, thereby making each of the apparatuses ready to communicate with the base station 200. The image forming apparatus 300 receives, from each of the optional apparatuses, the 5G-ID, the model number, and the serial number via 5G wireless communication.

<Communication Cooperation>

The image forming apparatus 300 and each of the optional apparatuses become ready for communication when arrangement order setting, which will be described below, is completed in addition to the above-described initial setting. FIG. 5 is a flowchart illustrating processing regarding wireless communication.

In step S101, the image forming apparatus 300 provides data to the wireless communication device 471 in order to transmit the content of processing to be performed. In step S102, the wireless communication device 471 converts the received data into a radio wave signal and emits the radio wave signal. In step S103, the base station 200 receives the emitted radio wave signal. In step S104, the base station 200 identifies the transmission destination and then emits the next radio wave signal. In step S105, the wireless communication device 451 of the finisher 305 receives the radio wave signal emitted by the base station 200. In step S106, the CPU 450 of the finisher 305 acquires information indicating the received processing content via the wireless communication device 451. Through the processing in the flowchart, the finisher 305 is notified of the processing content by the image forming apparatus 300.

The wireless communication between the other apparatuses can also be performed using similar control processing, and the information transmitted and received via wireless communication includes apparatus status information, consumable information, job progress information, and sheet conveyance timing information.

<Arrangement Order Setting>

In the present exemplary embodiment, to enable the image forming apparatus 300 to cooperate with each of the optional apparatuses, the arrangement order of the optional apparatuses is to be set. In a state where the optional apparatuses are linked after completion of the initial setting of each of the optional apparatuses for 5G wireless communication, the user sets the arrangement order by operating screens to be described next.

FIGS. 13A to 13E illustrate the screens for setting optional apparatuses. The screens of FIGS. 13A to 13D display narrowed-down optional apparatuses. More specifically, the screens display the optional apparatuses that are communicable with the image forming apparatus 300, allow the image forming apparatus 300 to discharge sheets, and have not yet been connected to the image forming apparatus 300. The screens make it easier for the user to perform an operation for selecting optional apparatuses.

Figure 13A:
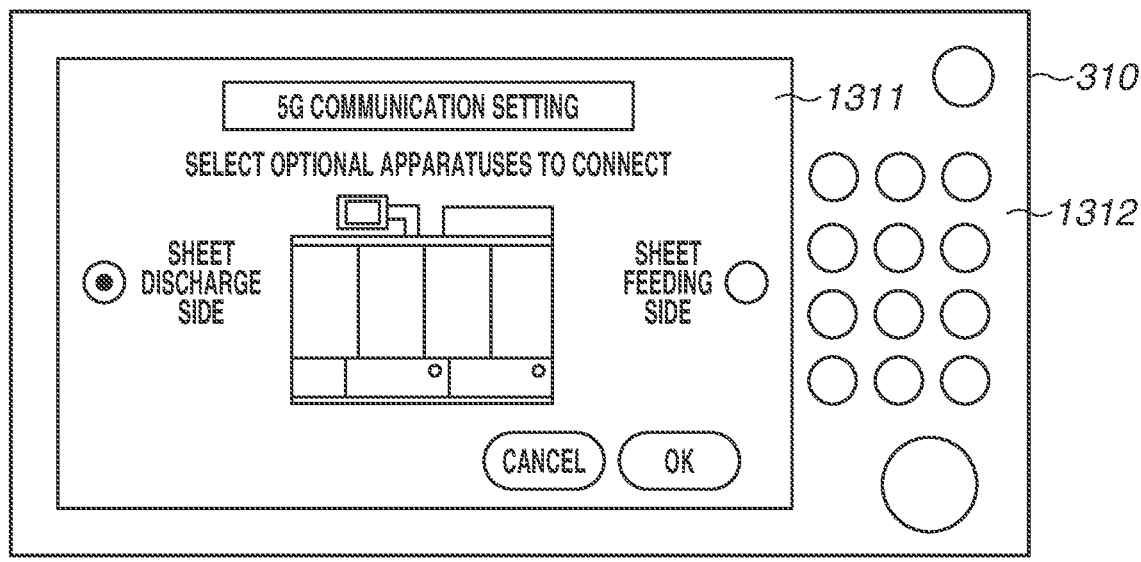
FIGS. 13A to 13E are diagrams each illustrating a screen for setting optional apparatuses according to one embodiment.

As illustrated in FIG. 13A, the operation unit 310 includes an image display unit 1311 and a numeric keypad 1312. The image display unit 1311 includes a display that provides a screen based on screen information output from the CPU 460. A pressure-sensitive sensor is provided on the display, which allows the operation unit 310 to detect a location touched by the user. Furthermore, a plurality of keys is arranged in the numeric keypad 1312, which allows the operation unit 310 to detect a key pressed by the user.

The screen illustrated in FIG. 13A is displayed when the user activates the operation unit 310 of the image forming apparatus 300 and selects the item representing the initial setting of optional apparatuses from a menu screen (not illustrated). To set the arrangement order, the user is first prompted to select whether to set an optional sheet discharge apparatus (a sheet discharge side) or set an optional sheet feeding apparatus (a sheet feeding side) on the screen illustrated in FIG. 13A. When the user selects the setting of the optional sheet discharge apparatus and selects an "OK" button, the screen illustrated in FIG. 13B is displayed.

Figure 13B:
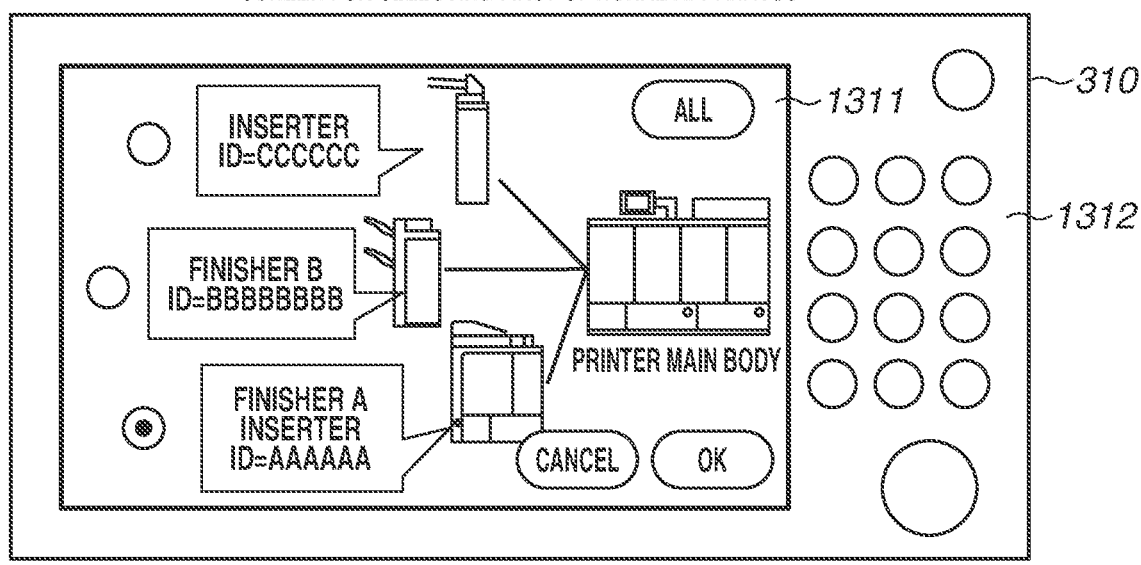

FIG. 13B illustrates a screen for selecting an optional sheet discharge apparatus to be connected to the image forming apparatus 300. On the screen illustrated in FIG. 13B, optional apparatuses connectable to the sheet discharge side of the image forming apparatus 300 are displayed among optional apparatuses communicable via the base station 200. When the user selects a finisher A inserter and selects an "OK" button, the screen illustrated in FIG. 13C is displayed.

Figure 13C:
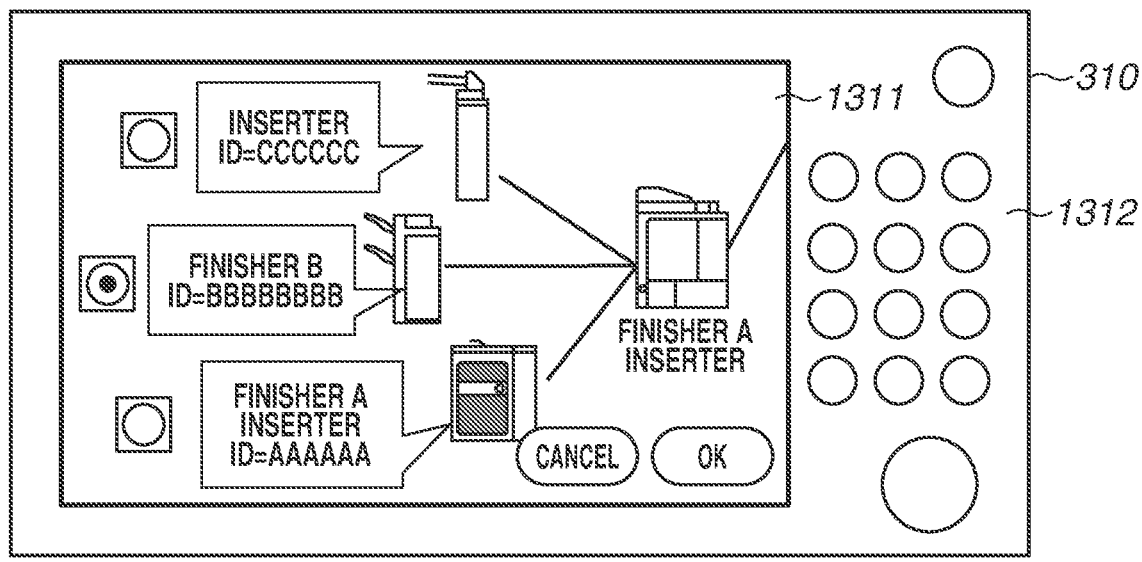

FIG. 13C illustrates a screen for selecting an optional sheet discharge apparatus to be connected to the finisher A inserter selected on the screen of FIG. 13B. On the screen illustrated in FIG. 13C, optional apparatuses connectable to a sheet discharge side (a predetermined position) of the finisher A inserter are displayed among the optional apparatuses communicable via the base station 200. When the user selects a finisher B and selects an "OK" button, the next screen is displayed. At this time, because there is no optional sheet discharge apparatus connectable to the finisher B among the optional apparatuses communicable via the base station 200 and no optional sheet feeding apparatus has not been set, the screen illustrated in FIG. 13D is displayed.

Figure 13D:
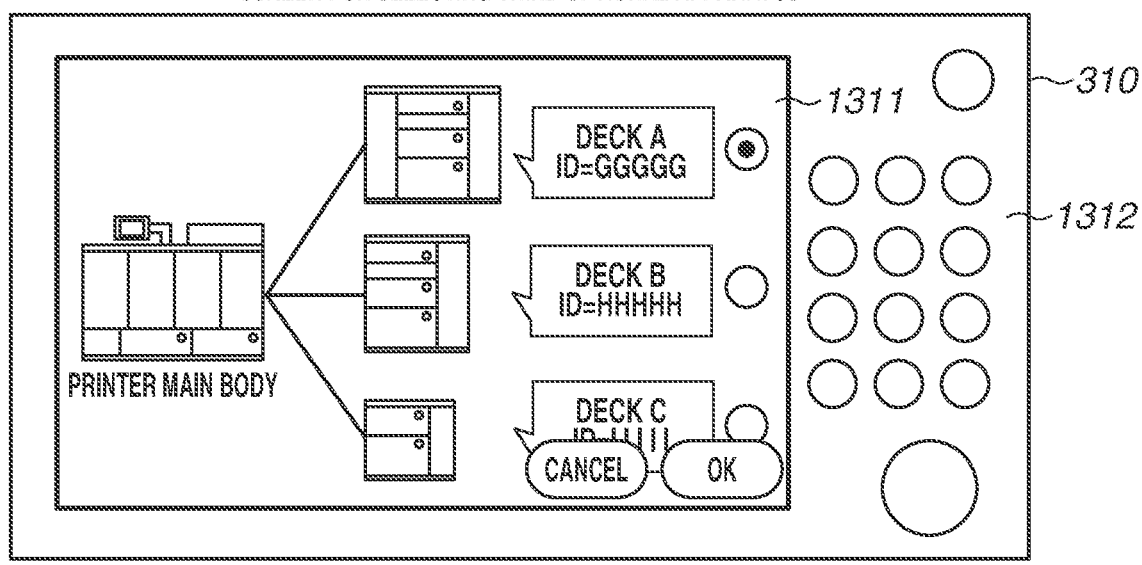

FIG. 13D illustrates a screen for selecting an optional sheet feeding apparatus to be connected to the image forming apparatus 300. On the screen illustrated in FIG. 13D, optional apparatuses connectable to the sheet feeding side of the image forming apparatus 300 are displayed among the optional apparatuses communicable via the base station 200. When the user selects a deck A and selects an "OK" button, the next screen is displayed. At this time, there is no optional sheet feeding apparatus connectable to the deck A among the optional apparatuses communicable via the base station 200. Thus, the operation for selecting the optional sheet feeding/discharge apparatuses for the image forming system 100 is determined to be completed, and the screen illustrated in FIG. 13E is displayed.

Figure 13E:
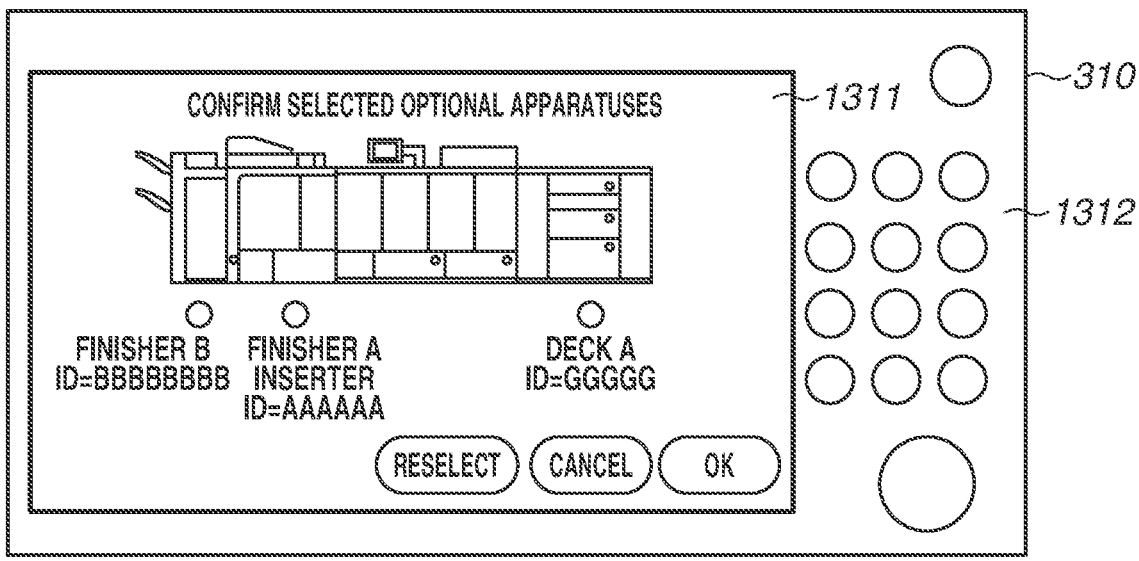

FIG. 13E illustrates a screen for confirming the selection of the optional apparatuses to be connected to the image forming apparatus 300. When the user selects an "OK" button, the selection of the optional apparatuses to be connected to the image forming apparatus 300 is completed. The selection of the optional apparatuses is canceled when the user's touch on a "Cancel" button is detected. The image forming apparatus 300 returns to the screen for selecting optional apparatuses when detecting the user's touch on a "Reselect" button. For example, if detecting that the user selects the finisher A inserter ID=AAAAA and touches the "Reselect" button, the image forming apparatus 300 returns to the screen illustrated in FIG. 13B.

In this manner, the screens of FIGS. 13A to 13E narrow down optional apparatuses and displays the optional apparatuses that are communicable with the image forming apparatus 300, allow the image forming apparatus 300 to discharge sheets, and have not yet been connected to the image forming apparatus 300. This facilitates the user's operation for selecting optional apparatuses, thereby improving the convenience for the user.

<Search for Optional Apparatuses>

Figure 14A:
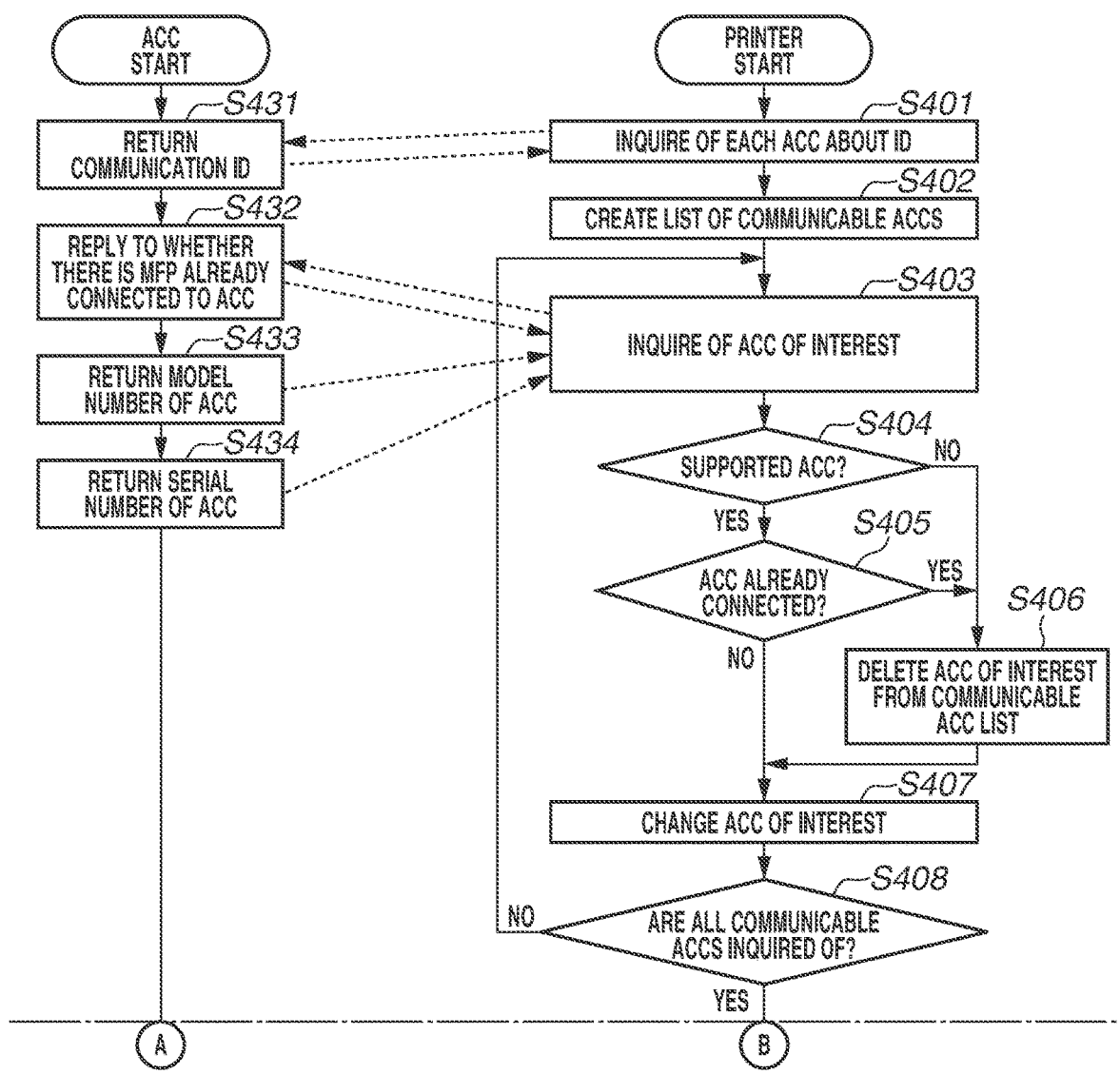
FIG. 14, consisting of FIGS. 14A and 14B, is a flowchart illustrating processing for detecting optional apparatuses according to one embodiment.
Figure 14B:
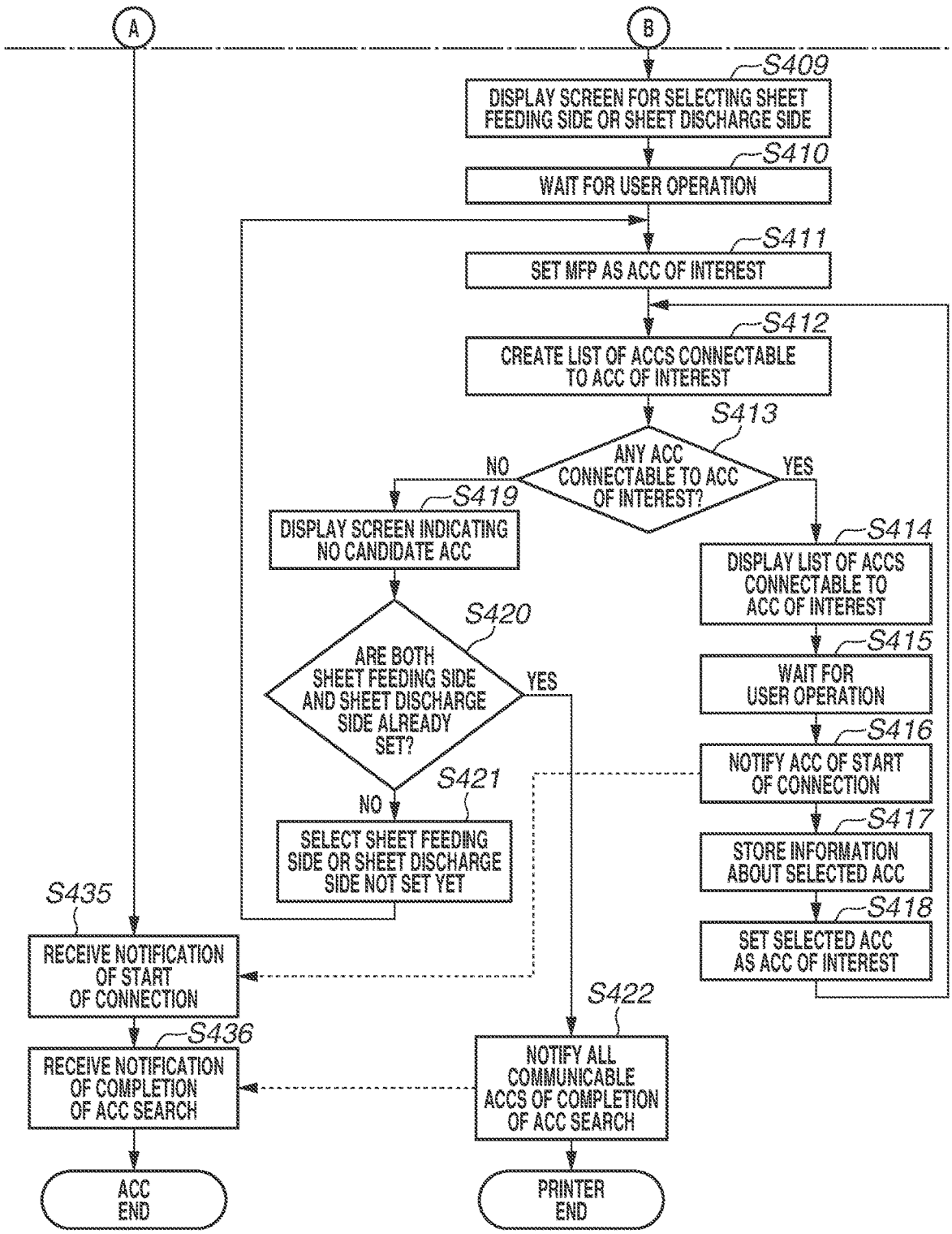

To provide the above-described UI, the image forming apparatus 300 searches for optional apparatuses communicable via 5G wireless communication as needed. The operation performed by the image forming apparatus 300 when searching for optional apparatuses (accessories or ACCs) will be described with reference to FIG. 14. FIG. 14 is a flowchart illustrating optional apparatus detection processing.

In the search for optional apparatuses, the image forming apparatus 300 communicates with optional apparatuses, creates a list of optional apparatuses that constitute the image forming system 100, and establishes wireless communication between the image forming apparatus 300 and each of the optional apparatuses.

The operation in steps S401 to S422 illustrated in FIG. 14 is implemented by the CPU 460 loading the program stored in the storage device 462 of the image forming apparatus 300 into the memory 461 and then executing the program.

In step S401, the CPU 460 inquires of each of optional apparatuses about the 5G-ID. When a reply to the inquiry is returned from the optional apparatus, the processing proceeds to step S402.

In step S402, the CPU 460 creates a list of optional apparatuses communicable with the image forming apparatus 300. More specifically, the CPU 460 creates a list of 5G-IDs of optional apparatuses located within the communicable area. After the list is created, the processing proceeds to step S403. In step S403, the CPU 460 makes further inquiries to acquire detailed information from the optional apparatuses. At this time, the CPU 460 makes the inquiries sequentially, starting from the optional apparatus corresponding to the smallest number in the 5G-ID list. In the following description, the optional apparatus under inquiry will be referred to as an optional apparatus of interest.

In step S403, the CPU 460 inquires of the optional apparatus of interest, and receives a reply from the optional apparatus of interest. The inquiry includes, for example, whether there is an image forming apparatus to which the optional apparatus of interest has already been connected, the model number of the optional apparatus of interest, and the serial number of the optional apparatus of interest. The CPU 460 waits until a reply is returned from the optional apparatus of interest. When a reply is returned, the processing proceeds to step S404. At this time, information such as the model number and the serial number of the optional apparatus is added to the list created in step S402.

In step S404, the CPU 460 determines whether the optional apparatus of interest is a supported optional apparatus. If the optional apparatus of interest is an unsupported optional apparatus (NO in step S404), the processing proceeds to step S406. If the optional apparatus of interest is a supported optional apparatus (YES in step S404), the processing proceeds to step S405.

In step S405, the CPU 460 checks whether the optional apparatus of interest is connected to another image forming system. If the optional apparatus of interest has already been connected to another image forming system (YES in step S405), the processing proceeds to step S406. If the optional apparatus of interest is not connected to another image forming system (NO in step S405), the processing proceeds to step S407.

In step S406, the CPU 460 deletes the information about the optional apparatus of interest from the list of optional apparatuses created in step S402.

In step S407, the CPU 460 changes the optional apparatus of interest. At this time, the CPU 460 sets, as the optional apparatus of interest, the optional apparatus corresponding to the smallest number in the 5G-ID list, among the optional apparatuses that have not yet been inquired of.

In step S408, the CPU 460 determines whether all the optional apparatuses included in the list created in step S402 are inquired of. If there is an optional apparatus that has not been inquired of, the optional apparatus of interest is changed (NO in step S408). Then, the processing returns to step S403. If all the optional apparatuses are inquired of and a list of candidate optional apparatuses is created (YES in step S408), the processing proceeds to step S409. An example of the list of candidate optional apparatuses will be described below.

In step S409, the CPU 460 displays, on the operation unit 310, a screen for selecting the sheet feeding side or the sheet discharge side. For example, the screen described with reference to FIG. 13A is displayed.

In step S410, the CPU 460 detects the user' selection of the sheet feeding side or the sheet discharge side.

In step S411, the CPU 460 sets the image forming apparatus 300 as the optional apparatus of interest.

In step S412, the CPU 460 creates a list of optional apparatuses from which sheets can be fed to the optional apparatus of interest or a list of optional apparatuses to which sheets can be discharged from the optional apparatus of interest.

In step S413, the CPU 460 determines whether there is an optional apparatus connectable to the optional apparatus of interest. If the list created in step S412 is empty, the CPU 460 determines that there is no connectable optional apparatus (NO in step S413). Then, the processing proceeds to step S419. If an optional apparatus is listed in the list created in step S412, the CPU 460 determines that there is a connectable optional apparatus (YES in step S412). Then, the processing proceeds to step S414.

In step S414, the CPU 460 displays the list of optional apparatuses connectable to the optional apparatus of interest. The list is created in step S412. By this processing, the screens described with reference to FIGS. 13B to 13D are displayed, for example.

In step S415, the CPU 460 detects that the user selects the next optional apparatus of interest. For example, the CPU 460 receives a selection of one optional apparatus on the screens described with reference to FIGS. 13B to 13D.

In step S416, the CPU 460 notifies the optional apparatus selected in step S415 about start of connection.

In step S417, the CPU 460 stores information about the optional apparatus selected in step S415. The information about the optional apparatus selected in step S415 is stored in the memory 461 or the storage device 462 of the image forming apparatus 300.

In step S418, the CPU 460 sets the optional apparatus selected in step S415 as the optional apparatus of interest. Then, the processing returns to step S412.

In step S419, the CPU 460 displays, on the operation unit 310, a screen indicating no candidate optional apparatus.

In step S420, the CPU 460 determines whether both the sheet feeding side and the sheet discharge side have been set. If both the sheet feeding side and the sheet discharge side have been set (YES in step S420), the processing proceeds to step S422. If both the sheet feeding side and the sheet discharge side have not been set (NO in step S420), the processing proceeds to step S421.

In step S421, the CPU 460 selects one of the sheet feeding side and the sheet discharge side that has not been set. Then, the processing returns to step S411.

In step S422, the CPU 460 notifies all the communicable optional apparatuses that the search for optional apparatuses is completed. The connections of the optional apparatuses are confirmed by the notification of the completion of the search for optional apparatuses.

Next, the operations performed by the optional apparatuses when the image forming apparatus 300 searches for optional apparatuses will be described with reference to FIG. 14.

In the search for optional apparatuses, the image forming apparatus 300 communicates with optional apparatuses, creates the list of optional apparatuses that constitute the image forming system 100, and establishes wireless communication between the image forming apparatus 300 and each of the optional apparatuses. The processing illustrated in steps S431 to S436 of FIG. 14 is implemented by the CPUs (410, 420, 440, and 450) loading programs stored in the respective storage devices (not illustrated) of the optional apparatuses into the respective memories and then executing the programs. The processing will be described using a case where the inserter 304 performs the processing.

In step S431, the CPU 440 returns the identification information for wireless communication, in response to the inquiry made by the image forming apparatus 300 in step S401. At this time, the CPU 440 returns the 5G-ID as the identification information.

In step S432, the CPU 440 replies to whether there is an image forming apparatus already connected to the optional apparatus, in response to the inquiry made by the image forming apparatus 300 in step S403.

In step S433, the CPU 440 returns the model number of the optional apparatus in response to the inquiry made by the image forming apparatus 300 in step S403.

In step S434, the CPU 440 returns the serial number of the optional apparatus in response to the inquiry made by the image forming apparatus 300 in step S403.

In step S435, the CPU 440 receives, from the image forming apparatus 300, the notification about the start of connection. Once receiving the notification about the start of connection, the CPU 440 replies that the optional apparatus has already been connected in a case where another image forming apparatus inquires of the CPU 440 about whether the optional apparatus has already been connected. This control prevents one optional apparatus from being connected to a plurality of image forming apparatuses at the same time.

In step S436, the CPU 440 receives, from the image forming apparatus 300, the notification about the completion of the search for optional apparatuses.

<Optional Apparatus List>

Next, examples of the lists created in the processing of FIG. 14 will be described with reference to FIGS. 15A to 15E. FIG. 15A illustrates an example of the list of identification information (5G-IDs) in the wireless communication with which the image forming apparatus 300 can communicate, which is created in step S402.

FIG. 15B illustrates an example of the list to which the model number and the serial number are added after the reply is received from the optional apparatus in step S403.

FIG. 15C illustrates an example of the list of optional apparatuses supported by the image forming apparatus 300. The list is used when the CPU 460 determines whether the optional apparatus is supported in step S404. For example, information about a stacker is listed in FIG. 15B and indicates that the stacker is wirelessly communicable. However, the image forming apparatus 300 does not support the stacker, and thus information about the stacker is not listed in FIG. 15C. Accordingly, in step S404, the stacker is determined to be an unsupported optional apparatus. On the other hand, information about the inserter 304 is listed in both FIGS. 15B and 15C. Accordingly, in step S404, the inserter 304 is determined to be a supported optional apparatus.

FIG. 15D illustrates an example of a list of supported optional apparatuses that is pre-stored in the image forming apparatus 300 for each of the optional apparatuses supported by the image forming apparatus 300. FIG. 15D illustrates a list of optional apparatuses supported by the inserter finisher. The list is used when the optional apparatus of interest is the inserter finisher and whether there is a supported optional apparatus is determined in step S413. The lists of FIGS. 15B and 15D are compared to each other, and an optional apparatus included in both of the lists is determined to be a supported optional apparatus. An optional apparatus not included in both of the lists is determined to be an unsupported optional apparatus.

FIG. 15E illustrates a list of optional apparatuses supported by the deck A. In this example, there is no optional apparatus supported by the deck A. Thus, in a case where the deck A is the optional apparatus of interest, an empty list is created in step S412. As a result, the list is determined to be empty in step S413.

FIG. 16 illustrates an example of a list of optional apparatuses set as cooperation targets. When the processing for setting optional apparatuses described with reference to FIG. 14 is completed, a list like the example illustrated in FIG. 16 is completed. In this example, the "deck A", the "inserter finisher", and the "finisher" are registered as the cooperation targets. The list illustrated in FIG. 16 includes a connection location field, and arrangement order information of the optional apparatuses is entered in this field. In the present exemplary embodiment, the location of the image forming apparatus 300 is defined as "0", and the arrangement order information is managed based on this location. More specifically, the arrangement order information is managed in such a manner that "4", "1", and "2" are assigned respectively to the "deck A", which is located next to the image forming apparatus 300 on the upstream side in the sheet conveyance direction, the "inserter finisher", which is located next to the image forming apparatus 300 on the downstream side in the sheet conveyance direction, and the "finisher", which is located second next to the image forming apparatus 300 on the downstream side in the sheet conveyance direction. The image forming system 100 gives an instruction to each of the optional apparatuses based on the arrangement order information when performing the image forming processing for forming images on sheets, thereby achieving the facilitation of sheet conveyance and the cooperative execution of various processes.

<Remarks>

As described above, in the present exemplary embodiment, when the arrangement order of the optional apparatuses to be connected to the image forming apparatus 300 is to be set, the image forming apparatus 300 displays a screen based on the list that narrows down optional apparatuses to actually usable ones. This provides excellent workability when the user sets the arrangement order.

In the present exemplary embodiment, the method in which the image forming apparatus 300 inquires of each optional apparatus has been described (with reference to steps S401 to S422) as the method for collecting the information about each optional apparatus. However, a different method may be employed as long as the information about each optional apparatus can be collected as a result thereof. For example, one optional apparatus may inquire of the other optional apparatuses on behalf of the apparatuses and notify the image forming apparatus 300 of collected information as a result of the inquiry. Alternatively, the base station 200 may inquire of each of the optional apparatuses in advance and notify the image forming apparatus 300 of collected information as a result of the inquiry.

Next, a second exemplary embodiment will be described. In the first exemplary embodiment, the configuration in which candidate processing apparatuses capable of cooperating with the image forming apparatus 300 are displayed and the user selects desired ones from among the candidate processing apparatuses. In the second exemplary embodiment, a configuration in which candidate processing apparatuses are narrowed down by using information about the angle of the radio wave between the base station 200 and each processing apparatus will be described. The configuration of the image forming system 100 according to the present exemplary embodiment is substantially similar to the configuration described in the first exemplary embodiment. Thus, the same components as those according to the first exemplary embodiment will be given the same reference numerals, and the detailed descriptions thereof will be omitted. In addition, in the present exemplary embodiment, the system configuration illustrated in FIG. 3 will be described as the basic configuration.

<Angle Detection>

As described with reference to FIG. 4B, the base station 200 includes the multi-antenna having the plurality of two-dimensionally arranged antennas. Thus, angle detection can be performed by using the plurality of antennas. For example, suppose that a radio wave from one transmission source reaches an antenna A and an antenna B among those included in the multi-antenna of the base station 200. Because the antenna A and the antenna B are spaced, the distance from the transmission source to the antenna A and the distance from the transmission source to the antenna B are assumed to be different. Accordingly, a very small difference occurs between the time taken until the wireless radio wave transmitted from the transmission source reaches the antenna A and the time taken until the wireless radio wave transmitted from the transmission source reaches the antenna B. The very small difference between the times can be detected as the phase difference of the received radio wave. Similarly, angle detection can be performed by using one antenna to receive the radio waves transmitted from a plurality of antennas and detecting the phase difference therebetween. Such an angle detection method is known as a method called Angle of Arrival (AoA), Direction of Arrival (DoA), Angle of Departure (AoD), or Direction of Departure (DoD). The positional relationship between the radio wave transmitting side and the radio wave receiving side can be detected as an angle $\theta$ by using any of the above-described methods, as long as a wireless communication environment with a plurality of antennas arranged is established.

<Image Forming System and Angle>

Figure 9A:
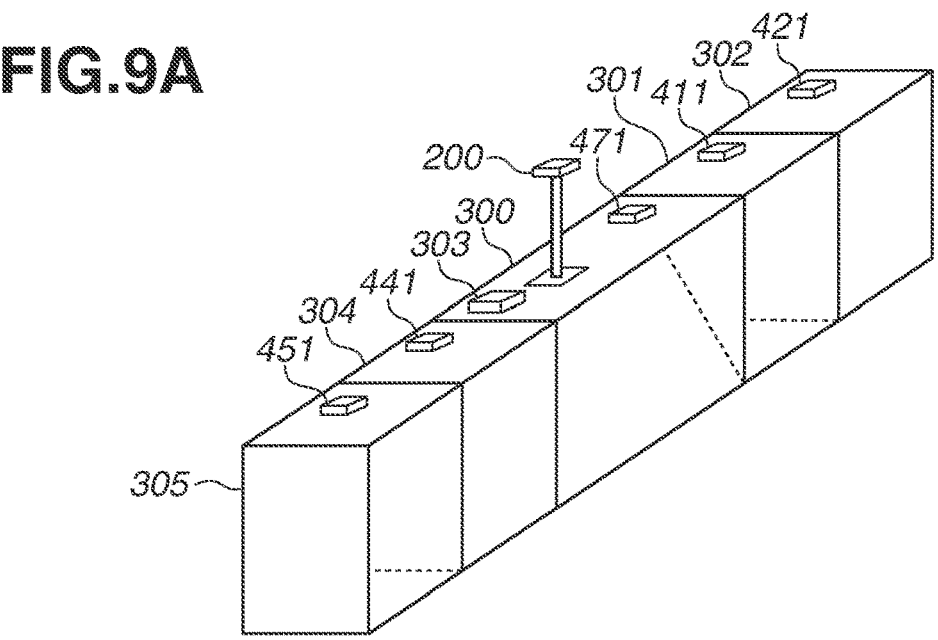
FIG. 9A is a diagram illustrating an arrangement relationship between the base station and each of the wireless communication devices according to one embodiment.
Figure 9B:
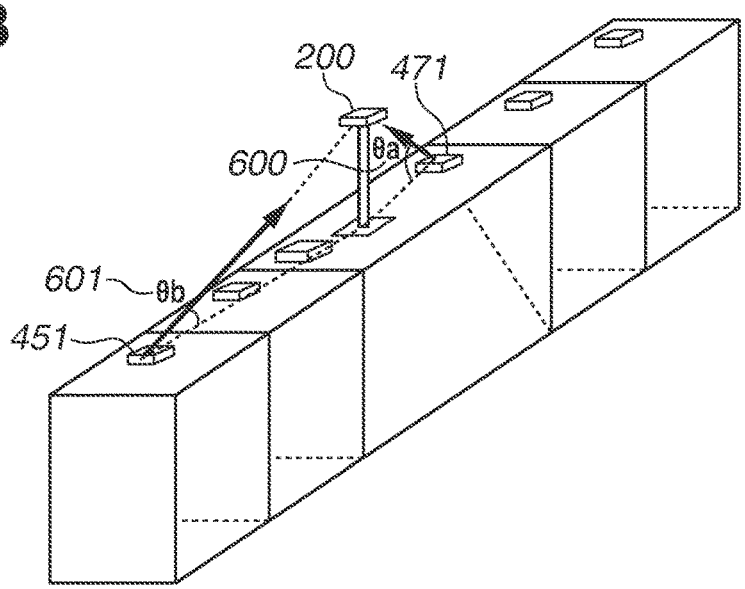
FIG. 9B is a diagram illustrating how a radio wave is transmitted between the base station and each of the wireless communication devices according to one embodiment.

FIG. 9A illustrates the arrangement relationship between the base station 200 and each of the wireless communication devices 411, 421, 441, 451, and 471. As illustrated in FIG. 9A, the image forming apparatus 300 and the optional apparatuses are arranged side by side along the sheet conveyance direction. In addition, the base station 200 is disposed above the image forming apparatus 300. Accordingly, the wireless communication devices 411, 421, 441, and 451 in the optional apparatuses and the base station 200 are arranged side by side along the sheet conveyance direction. In such a configuration, the radio wave transmitted from each of the wireless communication devices 411, 421, 441, 451, and 471 reaches the base station 200 along a route as indicated in FIG. 9B. FIG. 9B illustrates how the radio wave is transmitted between the base station 200 and each of the wireless communication devices 451 and 471. An angle $\theta a$ 600 represents the angle of the radio wave from the wireless communication device 471, and an angle $\theta b$ 601 represents the angle of the radio wave from the wireless communication device 451. Each of the radio wave angles θa and θb can be broken down into components in respective directions as illustrated in FIG. 9C.

Figure 9C:
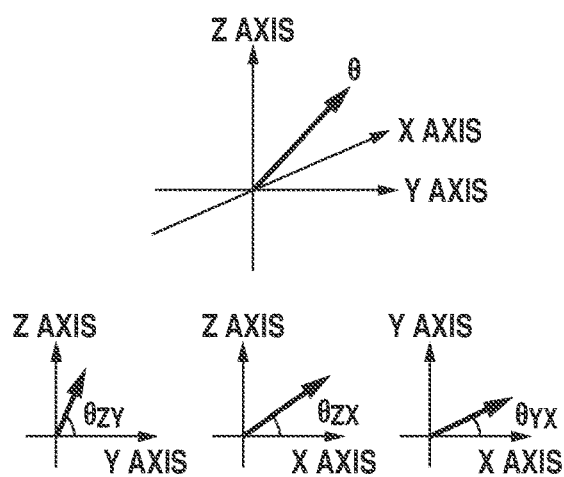
FIG. 9C is a diagram illustrating a radio wave angle three-dimensionally according to one embodiment.

FIG. 9C illustrates the radio wave angle θ three-dimensionally. The radio wave has components of three axes, namely, an X axis corresponding to the direction in which the apparatuses are lined up (i.e., the depth direction), a Y axis perpendicular to the X axis on a horizontal plane, and a Z axis perpendicular to the horizontal plane. In addition, the radio wave angle θ can be expressed as an angle θzy in the ZY plane, an angle θzx in the ZX plane, and an angle θyx in the YX plane.

<Classification Based on Radio Wave Angle>

Figure 10:
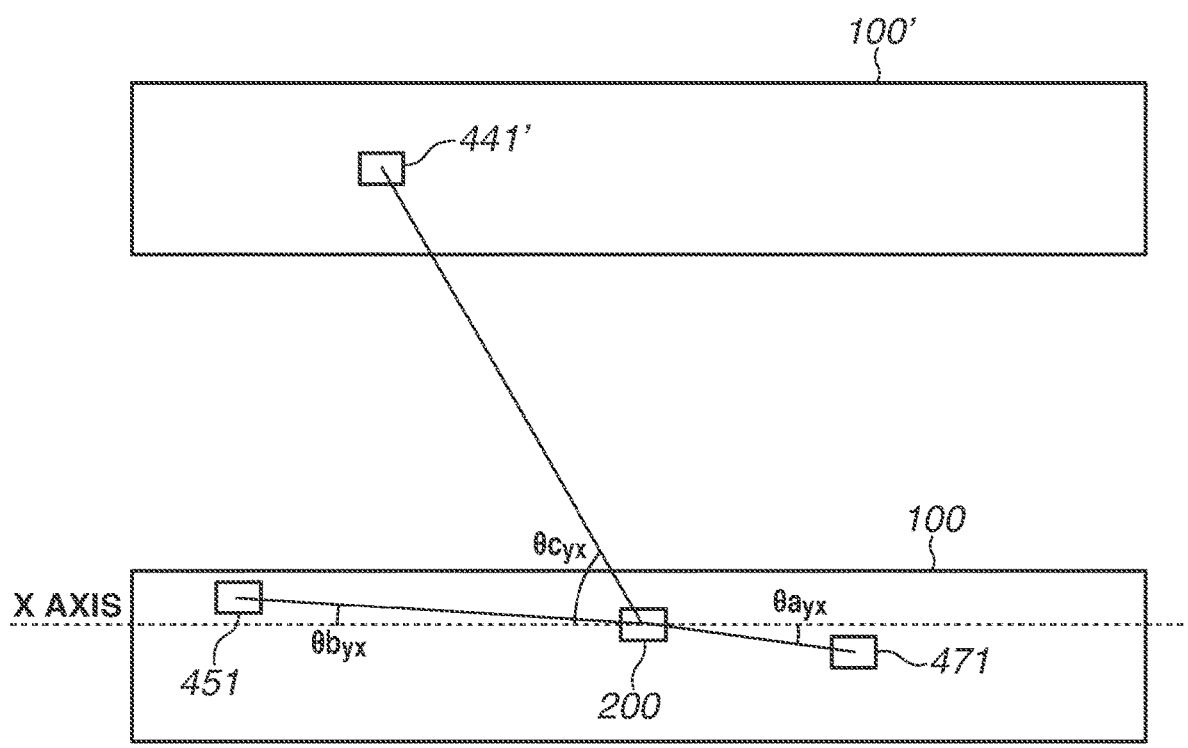
FIG. 10 is a top view illustrating a positional relationship between the base station and each of the wireless communication devices in the image forming system illustrated in FIG. 3 according to one embodiment.

FIG. 10 is a top view illustrating the positional relationship between the base station 200 and each of the wireless communication devices 411, 421, 441, 451, and 471 in the image forming system 100 illustrated in FIG. 3. As illustrated in FIG. 10, an image forming system 100' and the image forming system 100 are arranged close to each other. Thus, a wireless communication device 441' included in the image forming system 100' is within the communication range of the base station 200. If the setting of the arrangement order described in the first exemplary embodiment is performed in this environment, an erroneous operation may occur. For example, an apparatus that is not to cooperate with the image forming apparatus 300 may be specified as the cooperation target. In the present exemplary embodiment, the apparatuses that are to cooperate with the image forming apparatus 300 are extracted from all apparatuses connected to the base station 200. The extraction is carried out by using the information about the angle θ of the radio wave used in the communication between the base station 200 and each of the apparatuses connected thereto.

As illustrated in FIG. 10, in a case where the base station 200 is provided above the image forming apparatus 300, the wireless communication device 411, 421, 441, and 451 of the optional apparatuses and the base station 200 are arranged side by side along the sheet conveyance direction (the X axis). Thus, when viewed on the YX plane, an angle $\theta b_{yx}$ formed between the base station 200 and the wireless communication device 451 and an angle $\theta a_{yx}$ formed between the base station 200 and the wireless communication device 471 have relatively small values. On the other hand, when viewed on the YX plane, an angle $\theta c_{yx}$ formed between the base station 200 and the wireless communication device 441' has a relatively large value. Thus, whether an apparatus wirelessly connected to the base station 200 is to cooperate with the image forming apparatus 300 can be determined by setting a threshold for the angle on the YX plane. It is assumed here that installation angle information of the multi-antenna of the base station 200 is held in the image forming apparatus 300 in advance. Alternatively, the image forming apparatus 300 may acquire the installation angle information of the multi-antenna of the base station 200 from the base station 200 via communication.

Figure 11:
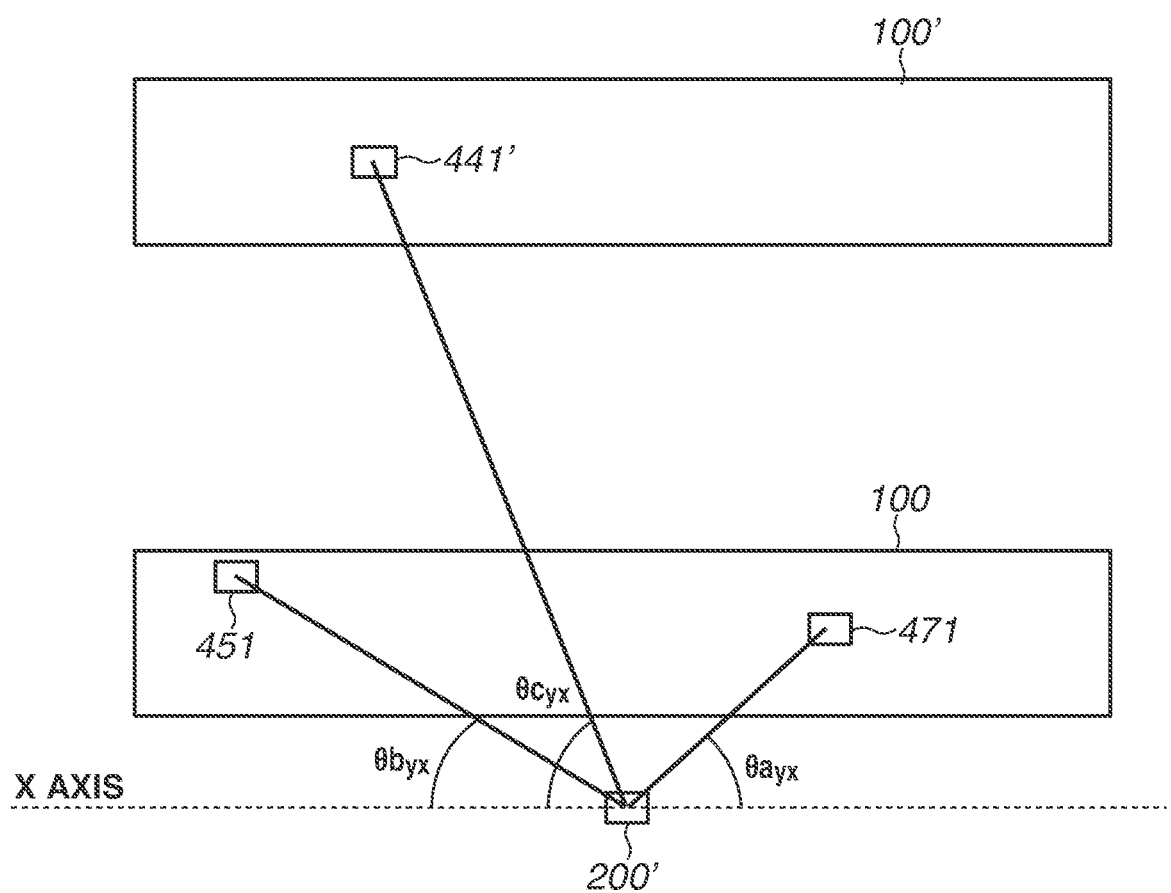
FIG. 11 is a top view illustrating a positional relationship between the base station and each of the wireless communication devices in the image forming system illustrated in FIG. 1 according to one embodiment.

FIG. 11 is a top view illustrating the positional relationship between the base station 200 and each of the wireless communication devices 411, 421, 441, 451, and 471 in the image forming system 100 illustrated in FIG. 1. As illustrated in FIG. 11, in a case where the base station 200 is provided at a location different from that of the image forming apparatus 300, the wireless communication devices 411, 421, 441, and 451 of the optional apparatuses are arranged side by side along the sheet conveyance direction, but the base station 200 is outside the arrangement. In this case, classification is performed by obtaining distance information using a conversion table based on an intensity value (a received signal strength indication (RSSI) value) of the radio wave between each wireless communication device and the base station 200, and using the obtained distance information and the angle information in combination.

When viewed on the YX plane, a distance Cos $\theta b_{yx}$ in the Y direction between the base station 200 and the wireless communication device 451 and a distance Cos $\theta a_{yx}$ in the Y direction between the base station 200 and the wireless communication device 471 have similar values. On the other hand, a distance Cos $\theta c_{yx}$ in the Y direction between the base station 200 and a wireless communication device 441' has a relatively large value. Thus, whether an apparatus wirelessly connected to the base station 200 is to cooperate with the image forming apparatus 300 can be determined by setting a threshold for the distance in the Y direction based on the distance Cos $\theta a_{yx}$. It is desirable to provide a plurality of wireless communication devices in the image forming apparatus 300 or use a multi-antenna in the wireless communication device 471 and hold information about the relationship between the antenna installation angle and the sheet conveyance direction in the image forming apparatus 300 in advance. This allows the relationship between the base station 200 and the X axis direction to be identified.

<Initial Setting Sequence>

Figure 8:
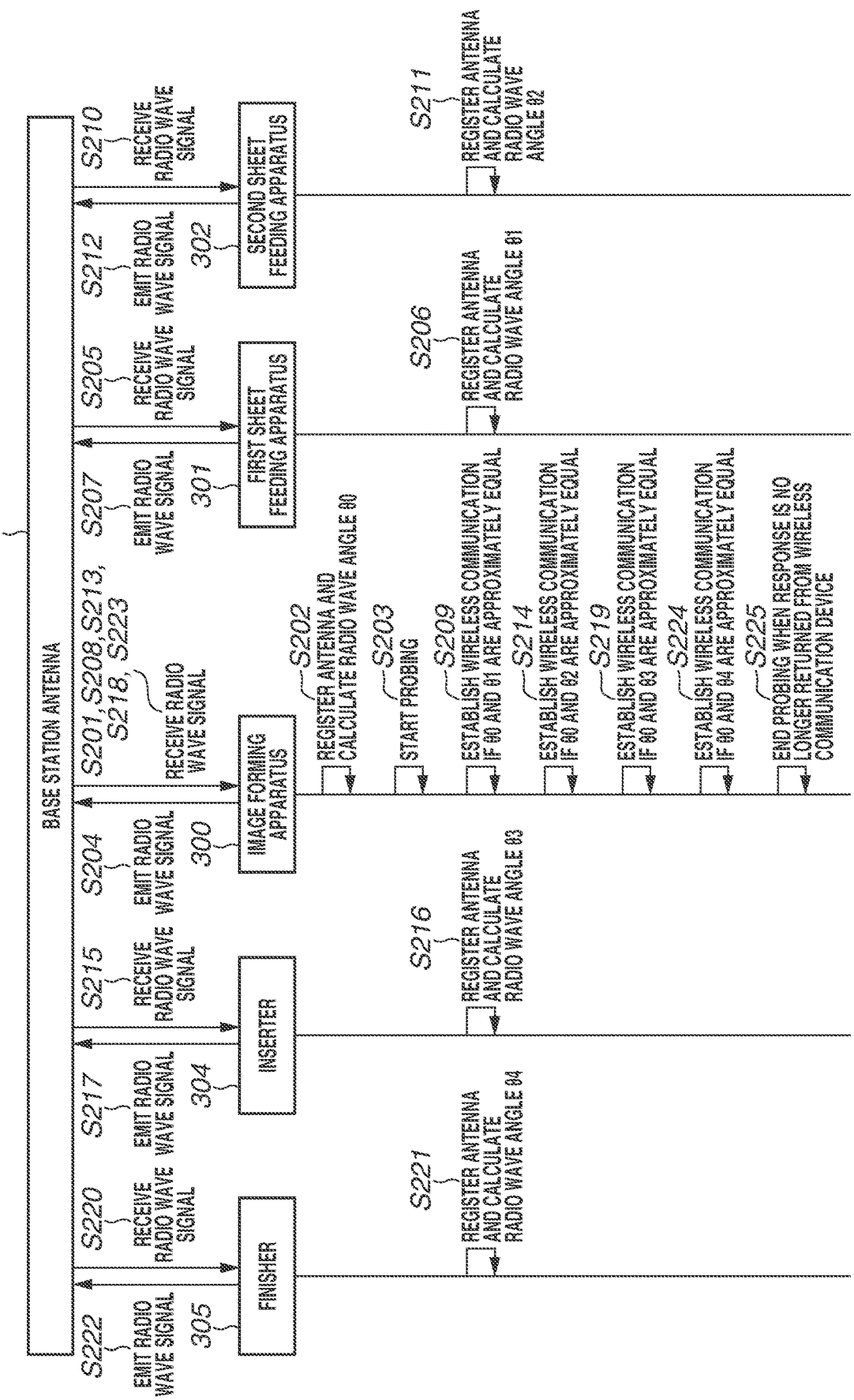
FIG. 8 is a diagram illustrating an initial setting sequence for communication according to one embodiment.

In the present exemplary embodiment, at the time of the initial setting for 5G wireless communication, processing is performed in which an apparatus having an angular relationship similar to the angular relationship between the base station 200 and the image forming apparatus 300 is determined to be the optional apparatus of the image forming apparatus 300 and then is registered as a communication partner apparatus. FIG. 8 illustrates an initial setting sequence for communication. A procedure for establishing wireless communication with the first sheet feeding apparatus 301, the second sheet feeding apparatus 302, the inserter 304, and the finisher 305 will be described with reference to FIG. 8.

In step S201, the image forming apparatus 300 is ready to receive a radio wave from the base station 200. In step S202, when an antenna registration instruction is received from the user, the image forming apparatus 300 performs antenna registration processing. Then, the CPU 460 measures an angle θ0 of the radio wave received from the base station 200 and stores the angle θ0 in the storage device 462.

Next, in step S203, the CPU 460 generates the content of probing processing and transmits the content to the wireless communication device 471. The wireless communication device 471 emits a radio wave signal using the method described with reference to FIG. 4A.

In step S204, the base station 200 emits a radio wave signal to each of the first sheet feeding apparatus 301, the second sheet feeding apparatus 302, the inserter 304, and the finisher 305.

In step S205, the wireless communication device 411 of the first sheet feeding apparatus 301 receives the radio wave signal from the base station 200. In step S206, based on the radio wave signal received by the wireless communication device 411, the CPU 410 performs the antenna registration processing and measures a radio wave angle θ1. Alternatively, in a case where the wireless communication device 411 emits a beacon, the CPU 410 may measure the radio wave angle of the radio wave signal returned from the base station 200 as the angle θ1.

In step S207, the CPU 410 generates the content of processing including the measured radio wave angle θ1 and transmits the content to the wireless communication device 411, and the wireless communication device 411 emits a radio wave signal.

In step S208, the wireless communication device 471 receives the radio wave signal from the wireless communication device 411 via the base station 200, thereby obtaining the angle θ1. Next, in step S209, the CPU 460 compares the angles θ1 and θ0, and performs the initial setting for the wireless communication device 411 if the angles θ1 and θ0 are approximately equal.

In step S210, the wireless communication device 421 of the second sheet feeding apparatus 302 receives the radio wave signal from the base station 200. In step S211, based on the radio wave signal received by the wireless communication device 421, the CPU 420 performs the antenna registration processing and measures a radio wave angle θ2. Alternatively, in a case where the wireless communication device 421 emits a beacon, the CPU 420 may measure the radio wave angle of the radio wave signal returned from the base station 200 as the angle θ2.

In step S212, the CPU 420 generates the content of processing including the measured radio wave angle θ2 and transmits the content to the wireless communication device 421, and the wireless communication device 421 emits a radio wave signal.

In step S213, the wireless communication device 471 receives the radio wave signal from the wireless communication device 421 via the base station 200, thereby obtaining the angle θ2. Next, in step S214, the CPU 460 compares the angles θ2 and θ0, and performs the initial setting for the wireless communication device 421 if the angles θ2 and θ0 are approximately equal.

In step S215, the wireless communication device 441 of the inserter 304 receives the radio wave signal from the base station 200. In step S216, based on the radio wave signal received by the wireless communication device 441, the CPU 440 performs the antenna registration processing and measures a radio wave angle θ3. Alternatively, in a case where the wireless communication device 441 emits a beacon, the CPU 440 may measure the radio wave angle of the radio wave signal returned from the base station 200 as the angle θ3.

In step S217, the CPU 440 generates the content of processing including the measured radio wave angle θ3 and transmits the content to the wireless communication device 441, and the wireless communication device 441 emits a radio wave signal.

In step S218, the wireless communication device 471 receives the radio wave signal from the wireless communication device 441 via the base station 200, thereby obtaining the angle θ3. Next, in step S219, the CPU 460 compares the angles θ3 and θ0, and performs the initial setting for the wireless communication device 441 if the angles θ3 and θ0 are approximately equal.

In step S220, the wireless communication device 451 of the finisher 305 receives the radio wave signal from the base station 200. In step S221, based on the radio wave signal received by the wireless communication device 451, the CPU 450 performs the antenna registration processing and measures a radio wave angle θ4. Alternatively, in a case where the wireless communication device 451 emits a beacon, the CPU 450 may measure the radio wave angle of the radio wave signal returned from the base station 200 as the angle θ4.

In step S222, the CPU 450 generates the content of processing including the measured radio wave angle θ4 and transmits the content to the wireless communication device 451, and the wireless communication device 451 emits a radio wave signal.

In step S223, the wireless communication device 471 receives the radio wave signal from the wireless communication device 451 via the base station 200, thereby obtaining the angle θ4. Next, in step S224, the CPU 460 compares the angles θ4 and θ0, and performs the initial setting for the wireless communication device 451 if the angles θ4 and θ0 are approximately equal.

In step S225, the wireless communication device 471 ends the probing when no longer receiving a response from a wireless communication device.

Figure 12:
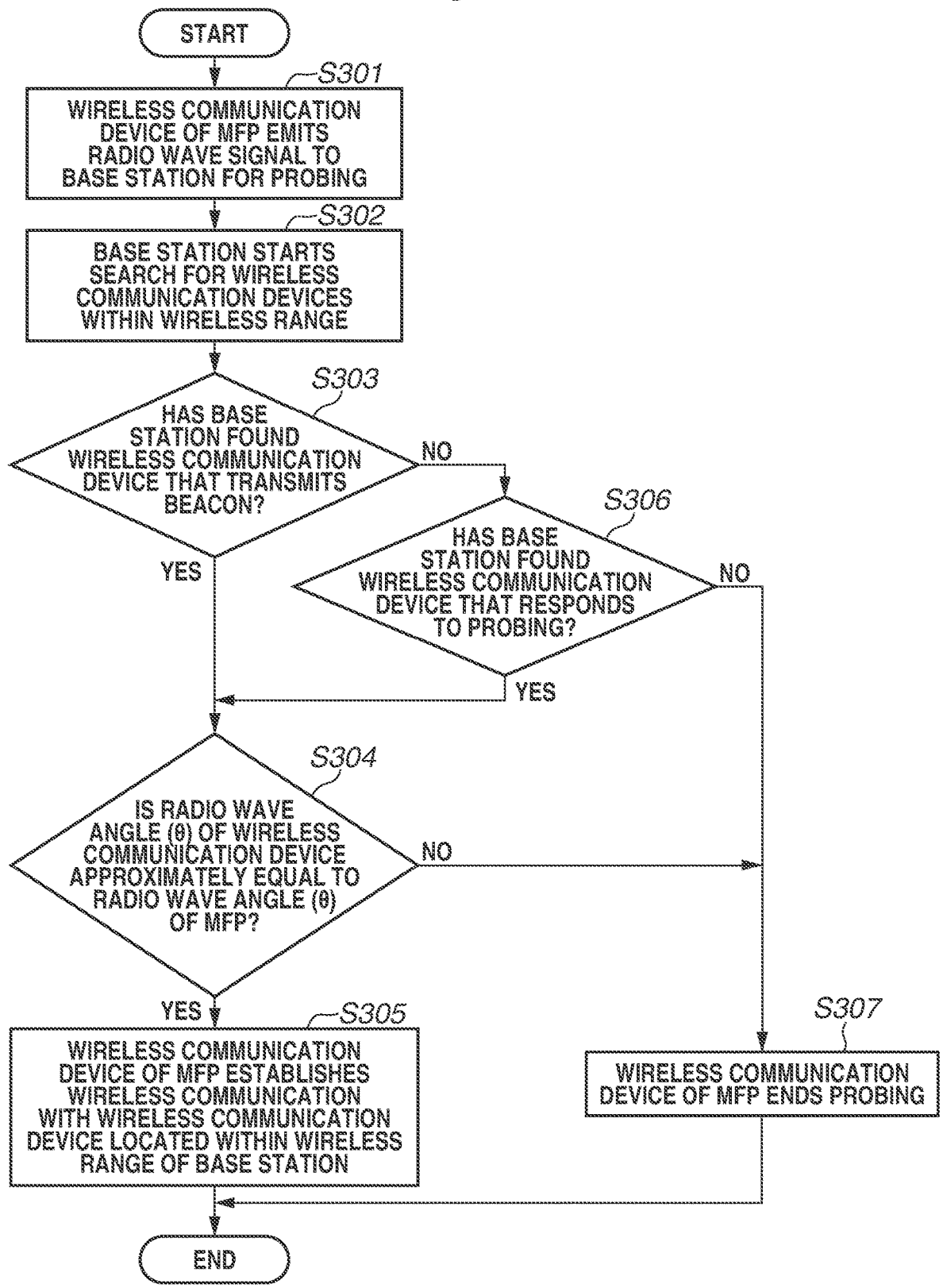
FIG. 12 is a flowchart illustrating an initial setting procedure for wireless communication performed by the image forming system according to one embodiment.

The sequence described with reference to FIG. 8 is performed based on a flowchart illustrated in FIG. 12. FIG. 12 is the flowchart illustrating an initial setting procedure for wireless communication, which is performed by the image forming system 100.

In step S301, the CPU 460 generates the content of probing processing for the base station 200 and transmits the content to the wireless communication device 471, and the wireless communication device 471 generates and emits a radio wave signal to the base station 200.

In step S302, the base station 200 emits a radio wave signal to each of wireless communication devices located within the wireless range of the base station 200.

In step S303, the base station 200 checks whether a beacon transmitted from a wireless communication device is received. If a beacon is received (YES in step S303), the processing proceeds to step S304. If not (NO in step S303), the processing proceeds to step S306.

In step S304, the base station 200 receives a radio wave signal from a wireless communication device that transmits a beacon or a wireless communication device that responds to the probing, and emits the radio wave signal to the wireless communication device 471. The CPU 460 obtains, based on the radio wave signal, the angle θ of the radio wave that the wireless communication device receives from the base station 200. Then, in step S304, the wireless communication device 471 compares the obtained angle θ with the angle θ of the radio wave that the wireless communication device 471 receives from the base station 200.

If the values are approximately equal as a result of the comparison (YES in step S304), the processing proceeds to step S305. If not (NO in step S304), the processing proceeds to step S307.

In step S305, the CPU 460 establishes wireless communication with the wireless communication device corresponding to the obtained angle θ having the approximately equal value, and completes the initial setting.

In step S306, if no beacon is received from a wireless communication device, the base station 200 performs the content of the probing processing transmitted from the wireless communication device 471 and emits a radio wave signal to each wireless communication device. At this time, if a response is returned from a wireless communication device to which the radio wave signal is emitted (YES in step S306), the processing proceeds to step S304. If no response is returned (NO in step S306), the processing proceeds to step S307.

In step S307, the base station 200 emits a radio wave signal to the wireless communication device 471 and notifies the wireless communication device 471 that there is no wireless communication device responding to the probing. In step S307, the wireless communication device 471 receives the radio wave signal from the base station 200 and ends the probing.

ACC stands for Accessory.
ADF stands for Auto Document Feeder
AOA stands for Angle of Arrival.

AOD stands for Angle of Departure.
ASIC stands for Application Specific Integrated Circuit.
CCD stands for Charge-Coupled Device.
CIS stands for Contact Image Sensor.
CPU stands for Central Processing Unit.
DOA stands for Direction of Arrival.
DOD stands for Direction of Departure.
3GPP stands for Third Generation Partnership Project.
HDD stands for Hard Disk Drive.
ID stands for Identification.
MIMO stands for Multiple Input Multiple Output.
PC stands for Personal Computer.
RAM stands for Random Access Memory.
ROM stands for Read Only Memory.
RSSI stands for Received Signal Strength Indication.
SIM Card stands for Subscriber Identity Module Card.
SSD stands for Solid State Drive.
UI stands for User Interface.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the present disclosure have been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-113358, filed Jun. 30, 2020, which is hereby incorporated by reference herein in its entirety.

What is claimed is:

1. An image forming system comprising:
an image forming apparatus configured to form an image on a sheet;
a plurality of accessory apparatuses arranged side by side along a conveyance direction of the sheet; and
a base station configured to wirelessly communicate with the image forming apparatus and the plurality of accessory apparatuses,
wherein the image forming apparatus comprises one or more controllers configured to function as:
(i) a unit configured to acquire, from the base station, information that the base station acquires by wirelessly communicating with the plurality of accessory apparatuses; and
(ii) a unit configured to output screen information for registering information about an arrangement order of the plurality of accessory apparatuses, based on the information acquired from the base station.

2. The image forming system according to claim 1, wherein the information acquired from the base station includes identification information of the plurality of accessory apparatuses.

3. The image forming system according to claim 1, wherein the information acquired from the base station includes information about a radio wave angle.

4. The image forming system according to claim 3, wherein the information about the radio wave angle is information about an angle of a radio wave that is transmitted by the base station and is received by each of the plurality of accessory apparatuses.

5. The image forming system according to claim 3, wherein the information about the radio wave angle is information about an angle of a radio wave that is transmitted by each of the plurality of accessory apparatuses and is received by the base station.

6. The image forming system according to claim 1, wherein the information acquired from the base station includes information about a positional relationship between the base station and each of the plurality of accessory apparatuses.

7. The image forming system according to claim 6, wherein the information about the positional relationship includes angle information.

8. The image forming system according to claim 7, wherein the information about the positional relationship includes distance information.

9. The image forming system according to claim 1, wherein the base station is attached to the image forming apparatus.

10. The image forming system according to claim 1, wherein the image forming apparatus includes a display unit configured to display a screen based on the screen information.

11. The image forming system according to claim 10, wherein the screen is a screen for determining an apparatus connected at a predetermined location, from among a plurality of candidate apparatuses based on the information acquired from the base station.

12. The image forming system according to claim 10, wherein the screen is a screen for prompting confirmation of the arrangement order of the plurality of accessory apparatuses for which the arrangement order is determined based on the information acquired from the base station.

13. An image forming apparatus configured to form an image on a sheet and configured to wirelessly communicate, via a base station, with a plurality of accessory apparatuses arranged side by side along a conveyance direction of the sheet, wherein the image forming apparatus comprises one or more controllers configured to function as:

(i) a unit configured to acquire, from the base station, information that the base station acquires by wirelessly communicating with the plurality of accessory apparatuses; and (ii) a unit configured to output screen information for registering information about an arrangement order of the plurality of accessory apparatuses, based on the information acquired from the base station.

14. The image forming apparatus according to claim 13, wherein the information acquired from the base station includes identification information of the plurality of accessory apparatuses.

15. The image forming apparatus according to claim 13, wherein the information acquired from the base station includes information about a radio wave angle.

16. The image forming apparatus according to claim 15, wherein the information about the radio wave angle is information about an angle of a radio wave that is transmitted by the base station and is received by each of the plurality of accessory apparatuses.

17. The image forming apparatus according to claim 15, wherein the information about the radio wave angle is information about an angle of a radio wave that is transmitted by each of the plurality of accessory apparatuses and is received by the base station.

18. The image forming apparatus according to claim 13, wherein the information acquired from the base station includes information about a positional relationship between the base station and each of the plurality of accessory apparatuses.

19. The image forming apparatus according to claim 18, wherein the information about the positional relationship includes angle information.

20. The image forming apparatus according to claim 19, wherein the information about the positional relationship includes distance information.

21. The image forming apparatus according to claim 13, wherein the base station is attached to the image forming apparatus.

22. The image forming apparatus according to claim 13, wherein the image forming apparatus includes a display unit configured to display a screen based on the screen information.

23. The image forming apparatus according to claim 22, wherein the screen is a screen for determining an apparatus connected at a predetermined location, from among a plurality of candidate apparatuses based on the information acquired from the base station.

24. The image forming apparatus according to claim 22, wherein the screen is a screen for prompting confirmation of the arrangement order of the plurality of accessory apparatuses for which the arrangement order is determined based on the information acquired from the base station.

* * * * *